(12) United States Patent
Atwell

(10) Patent No.: US 6,470,285 B1
(45) Date of Patent: Oct. 22, 2002

(54) METHOD AND APPARATUS FOR MULTI-PARAMETER DIGITAL PULSE PILEUP REJECTION

(75) Inventor: Thomas L. Atwell, Escondido, CA (US)

(73) Assignee: Analyser Systems AG, Zug (CH)

( * ) Notice: Subject to any disclaimer, the term of this patent is extended or adjusted under 35 U.S.C. 154(b) by 0 days.

(21) Appl. No.: 09/558,972

(22) Filed: Apr. 25, 2000

Related U.S. Application Data
(60) Provisional application No. 60/136,647, filed on May 27, 1999.

(51) Int. Cl.[7] ................................................. G01T 7/02
(52) U.S. Cl. ............................. 702/66; 702/67; 702/69; 702/75; 702/76; 702/189
(58) Field of Search ........................ 702/66–71, 75–80, 702/108, 124–126, 183, 188, 189, FOR 103–104, FOR 107–11, FOR 130–131, FOR 134–135, FOR 140, FOR 154, FOR 170–171; 250/363.02, 363.03, 363.04, 369, 252.01, 370.06; 378/53, 91, 210; 324/307, 310, 316; 327/3, 14, 17, 18, 20, 78, 79, 80, 335, 336, 339

(56) References Cited

U.S. PATENT DOCUMENTS

| | | |
|---|---|---|
| 3,053,388 A | 9/1962 | Tittle |
| 3,748,473 A | 7/1973 | Chen ........................... 250/392 |
| 3,781,556 A | 12/1973 | Taylor et al. ................ 250/302 |
| 3,832,545 A | 8/1974 | Bartko ......................... 250/312 |
| 3,984,689 A | 10/1976 | Arseneau .................... 250/369 |

(List continued on next page.)

FOREIGN PATENT DOCUMENTS

| | | |
|---|---|---|
| WO | 93 22692 | 11/1993 |
| WO | WO 00/73819 | 12/2000 |

OTHER PUBLICATIONS

Knoll, "Radiation Detection and Measurement", 2nd Ed., John Wiley and Sons, New York, p. 96–97 (1989).

EG & G ORTEC, 100 Midland Road, Oak Ridge, Tennessee 37831, 97/98 Catalog, P. 2.234–2.236 and 2.242–2.243.

Drndarevic, VR., et al., "A Signal processor for High Counting Rate Gamma Ray Spectroscopy with NAL(T1) Detectors," 1987 *Nuclear Science Symposium on Nuclear Power Systems*, San Francisco, Ca., Oct. 21–23 (1987), V.35, No. 1, Pt. 1 p. 222–225.

*Primary Examiner*—Marc S. Hoff
*Assistant Examiner*—Carol S Tsai
(74) *Attorney, Agent, or Firm*—John J. Murphey

(57) ABSTRACT

A method and apparatus for rejecting signals exhibiting pulse pile-up and devices incorporating the method and/or apparatus. A pulse sensor senses pulses and an analog-to-digital converter digitizes the sensed pulses into discrete ADC values over a plurality of time slices. The digitized pulses are stored in a FIFO memory for processing by a classification processor. The processor qualifies the pulse and marks its first time slice. The processor includes accumulators that calculate parameters from various regions of the pulse. The calculated parameters are compared to criteria from identical regions of known, non-piled pulses. Pulses whose calculated parameters meet the criteria are accepted and stored in one memory location, and pulses whose calculated parameter do not meet the criteria are rejected and stored in another memory location.

26 Claims, 20 Drawing Sheets

U.S. PATENT DOCUMENTS

| | | | |
|---|---|---|---|
| 4,028,267 A | 6/1977 | Ragner et al. | 250/359 |
| 4,152,596 A | 5/1979 | Marshall, III | 250/390 |
| 4,171,485 A | 10/1979 | Marshall | 250/359 |
| 4,266,132 A | 5/1981 | Marshall, III | 250/359 |
| 4,428,902 A | 1/1984 | Murray | 376/656 |
| 4,582,992 A | 4/1986 | Atwell et al. | 250/359.1 |
| 4,593,198 A * | 6/1986 | Pang et al. | 250/366 |
| 4,682,043 A | 7/1987 | Marshall | 250/358 |
| 5,053,185 A | 10/1991 | Christensen et al. | 376/157 |
| 5,132,540 A * | 7/1992 | Adolph et al. | 250/369 |
| 5,151,601 A | 9/1992 | Regimand | 250/390.04 |
| 5,162,096 A | 11/1992 | Gozani | 376/159 |
| 5,266,159 A | 11/1993 | Greenwood et al. | 162/17 |
| 5,315,124 A | 5/1994 | Goss et al. | 250/497.1 |
| 5,396,071 A | 3/1995 | Atwell et al. | 250/358.1 |
| 5,432,353 A | 7/1995 | Goss et al. | 250/497.1 |
| 5,532,492 A | 7/1996 | He et al. | 250/390.05 |
| 5,684,850 A * | 11/1997 | Warburton et al. | 378/53 |
| 5,732,115 A | 3/1998 | Atwell et al. | 376/159 |
| 5,841,140 A * | 11/1998 | Mc Croskey et al. | 250/363.03 |
| 5,864,391 A | 1/1999 | Hosokawa et al. | 356/401 |
| 5,864,515 A | 1/1999 | Stinchcombe | 367/103 |
| 5,870,051 A * | 2/1999 | Warburton et al. | 341/155 |
| 5,884,234 A * | 3/1999 | Jorion et al. | 702/66 |
| 5,905,458 A | 5/1999 | Ashihara | |
| 5,905,459 A | 5/1999 | Bunch | 347/70 |
| 6,072,177 A * | 6/2000 | McCroskey et al. | 250/252.1 |
| 6,295,508 B1 * | 9/2001 | Trammell et al. | 702/107 |
| 6,297,506 B1 * | 10/2001 | Young et al. | 250/369 |
| 6,310,349 B1 * | 10/2001 | Wong et al. | 250/363.09 |
| 6,327,549 B1 * | 12/2001 | Bingham et al. | 702/180 |

\* cited by examiner

BLOCK DIAGRAM OF AD9070, 10 BIT ADC WITH DIFFERENTIAL INPUTS
AIN, AIN/ AND DIGITAL OUTPUTS D9-D0.

OPAMP AD9631 DRIVING ADC AD9070 WITH LEVEL SHIFTING FROM OpAMP 820
(REFERENCE ANALOG DEVICES, NORWOOD, MA, PRODUCT DATASHEET AD 9070).
TO ACCOMMODATE $V_{IN}$ SIGNAL FROM 0-4 VOLTS, CHANGE R1 FROM 350Ω TO 1400Ω,
AND R2 FROM 1kΩ OHM TO 562Ω.

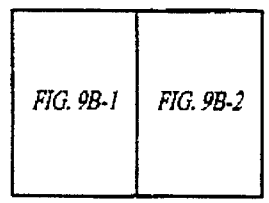
FIG. 9B
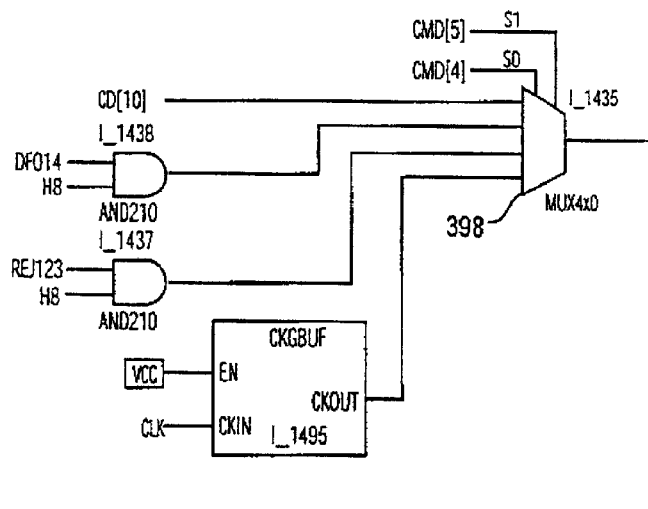
FIG. 9B-2
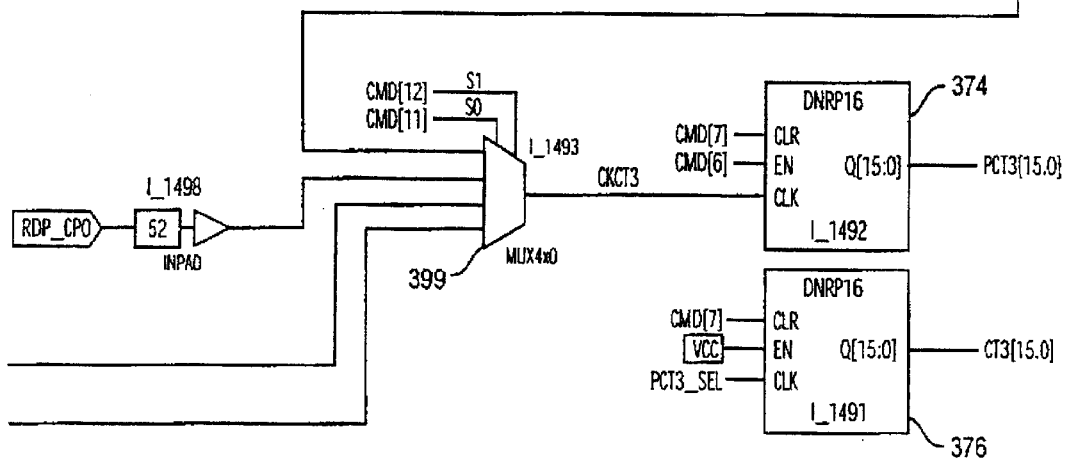

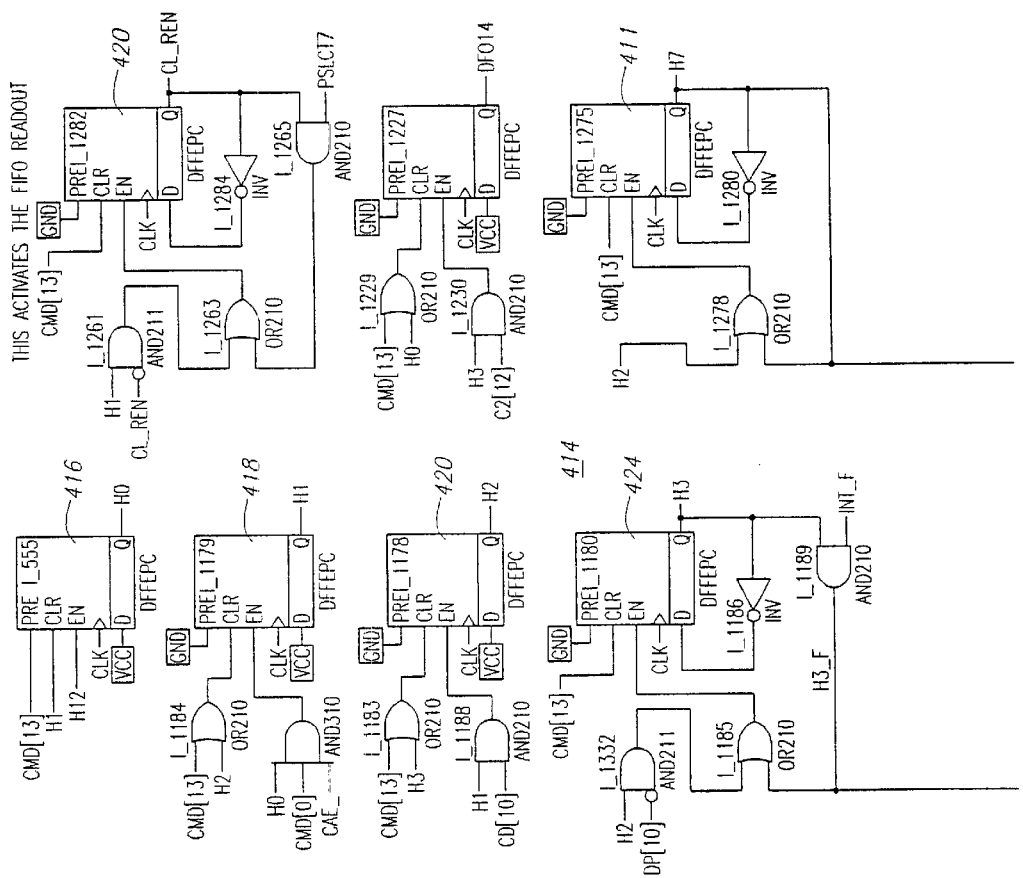

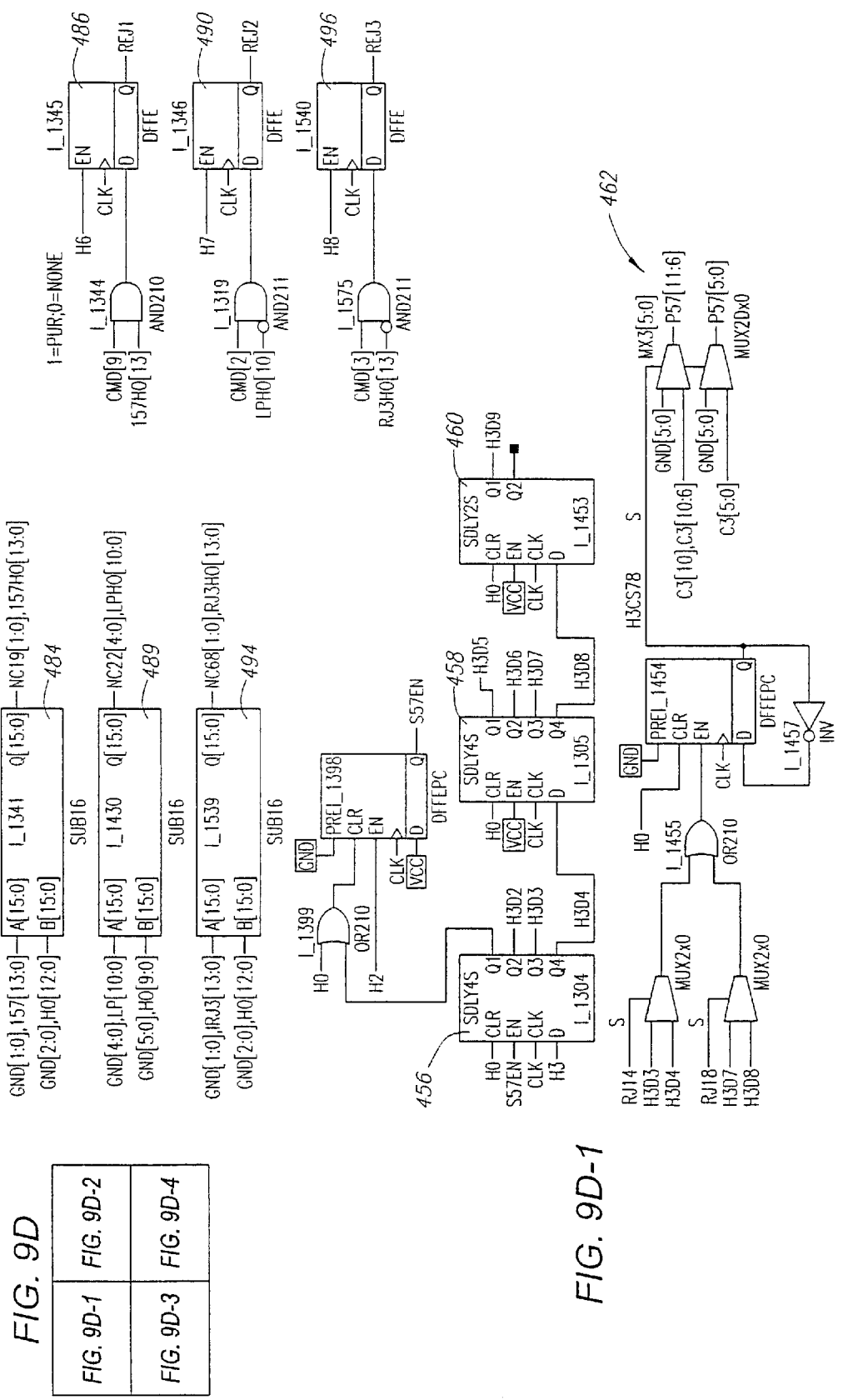

METHOD AND APPARATUS FOR MULTI-PARAMETER DIGITAL PULSE PILEUP REJECTION

This application claims the benefit of provisional application 60/136,647 filed May 27, 1999.

FIELD OF THE INVENTION

The present invention relates to a digital pulse processor and, more particularly, relates to a processor that uses multiple parameters and criteria for rejecting piled or contaminated pulses.

BACKGROUND OF THE INVENTION

In electronic sensing applications where information occurs randomly in time, such as in nuclear processes, there is a finite and calculable probability that two or more discrete pulse events will overlap to form a contaminated or "piled-up" pulse event. Similarly, in sensing applications involving two or more constant frequency but asynchronous sources whose inputs are summed into one, there is also a calculable probability of a piled-up pulse event.

Many such applications require integration of a pulse over a time interval to determine its energy content or to analyze its shape for Doppler or other determinations. If the pulse is contaminated or piled-up, a significant decrease in measurement quality will result. Consider, for example, an example from the field of nuclear spectroscopy. A first X- or Gamma-ray of energy E1 enters a sensor at time T1, and a second ray of energy E2 enters the sensor at time T2, where T2−T1 is less than the integration time IT. The energy integral is a composite of rays E1 and E2, and is accumulated in the spectrum being collected as a pseudo ray of energy E3, where E1<E3<=E1+E2. This contamination of the spectrum decreases the accuracy of the resultant spectrographic analysis.

FIGS. 1a–1c graphically depict the phenomenon of pulse pileup. In FIGS. 1a–1c, the horizontal axis represents time (ns) and the vertical axis represents the digitized pulse amplitude. Eight digitized pulses 1–8 are depicted, with the pulses being numbered in time sequence order. FIG. 1a plots pulses 1, 3, 5 and 8 and FIG. 1b plot pulses 2, 4, 6 and 7. In the first plot, pulses 1, 3, 5 and 8 are single events contained within integration zones depicted by the vertical dashed lines. Similarly, in the second plot, pulses 2, 4, 6 and 7 are single events contained within integration zones depicted by the vertical dashed lines. The energy of the X- or Gamma-ray that pulses 1–8 might represent is determined by computing the sum of n-points of digitized pulse data within an integration zone, dividing this sum by a fixed number, and truncating the result to an integer. The resultant integer is an energy bin or channel into which the pulse event is placed to become a part of the spectra.

FIG. 1c plots the combination of pulses 1–8. The overlap of the pulses within the integration zones results in four pulses: pulse 1,2 is the combination of pulses 1 and 2; pulse 3,4 is the combination of pulses 3 and 4; pulse 5,6 is the combination of pulses 5 and 6; and pulse 7,8 is the combination of pulses 7 and 8. In a sensor that cannot determine that these pulses are not from single rays, i.e. a sensor without pileup rejection, pulses 1,2; 3,4; 5,6; and 7,8 would be processed as single pulses and be recorded in the measured spectra. Since these piled-up pulses are not analytically meaningful, however, the spectra of singularly measured rays are contaminated and spectral analysis errors result.

In random processes, such as those encountered in nuclear applications, POISSON Statistics are used to calculate the probability of pulse pileup or contamination during an integration period. POISSON Statistics are explained in detail in Glenn F. Knoll, "Radiation Detection and Measurement", $2^{nd}$ Edition, John Wiley & Sons, New York, 1989, pages 96–97 (hereinafter "Knoll"). Over an integration period t with an average count rate r, the probability that a first event will be contaminated by a second event is given by equation 1:

$$P(r,t)=e^{-rt}.$$

Equation 1 is derived by integrating Equation 3-60 on page 97 of Knoll over the interval 0 to t.

Table 1, which follows this detailed description, outlines the pulse pileup probability for various integration periods and count rates, calculated using Equation 1. For high count rates, pulse pileup occurs a relatively large percentage of the time. For example, referring to Table 1, if the count rate is 400,000 events/second, and the integration period is 400 ns, P(400000,400 ns)=0.147856, meaning that there will be pulse pileup 14.78% of the time. For low count rates, conversely, the probability of pulse pileup is much lower. For a count rate of 10,000 events/second and an integration period of 400 ns, P(10000,400 ns)=0.003992, or only 0.4% of the time. Similarly, as the integration period is increased, the pulse pileup probability also increases.

Before pulse digitization and microprocessor integration techniques were available, analog methods were used. Conventional analog methods employed an integrating operational amplifier. After a pulse passes through the amplifier, the voltage on the output of the amplifier is proportional to the area under the pulse. A multi-channel analyzer read this voltage and tallied the events in electronic memory bins or channels. The number of the bin or channel was proportional to the size of integrated voltage and the energy or size of the pulse event. The result was a spectrum of energy or size. Between pulses, the integrating capacitor on the amplifier was shorted to ground to discharge the integral voltage.

Analog techniques such as this also have difficulty in detecting pulses that have been contaminated with pileup from other randomly occurring events, particularly small pulses overlaid on large pulses, and vice-versa. One type of analog pileup rejection utilizes a constant fraction timing approach on both the leading and trailing edges of the analog pulse to determine key aspects of the pulse's shape. This method has been commercialized and is discussed in "Modular Pulse-Processing Electronics and Semiconductor Radiation Detectors", EG&G ORTEC, 100 Midland Road, Oak Ridge, Tenn. 37831, 1997/98 catalog, pages 2.234–2.236 and 2.242–2.243. A second type of analog pileup rejection is described by Marshall, U.S. Pat. No. 4,152,596. This patent describes a system utilizing slow and fast amplifiers and a pulse width determining means, wherein for a pulse to be classified as accepted as a single event, it was required that (1) the amplitudes of the outputs of both amplifiers be consistent with a single event producing both outputs, and (2) the width of the output pulse from the fast amplifier must also be consistent with that of a single event.

In view of the above, it can be seen that a means for reliably filtering or rejecting contaminated or piled-up pulses is necessary for accurate and quality pulse processing and analysis.

SUMMARY OF THE INVENTION

An extremely sensitive method and apparatus for rejection of pulses contaminated by pulse pileup or other interference is provided. In spectroscopy, the present invention greatly improves the purity and quality of spectra. The invention is especially useful in high count rate applications, where the probability of random pulse overlap during the energy integration period is significant. The present invention can be implemented off-line or in real-time without loss of throughput. A plurality, preferably several, parameters that characterize the shape of ideal or non-piled pulses are chosen. The parameters are chosen to effectively discriminate piled pulses from non-piled pulses. Typically, these parameters are checked against measured values for non-piled pulses that are stored in a lookup table or library. Statistical multipliers of the standard deviations of each measured parameter are typically use to control the rejection sensitivity. The method utilizes digitized pulses or portions of pulses.

Thus, in one aspect, the present invention provides a method for processing a pulse. The method involves comparing at least one, but preferably a plurality of parameters for a pulse, with those parameters for a non-piled pulse. The comparison for a parameter can be performed in various ways, for example, by comparison of a parameter determined or measured for a pulse with a value of that parameter in a lookup table or library, or by calculating the value of the parameter for a non-piled pulse. The comparison and/or the determination of a parameter can include determining a relationship between other parameters of the pulse. The pulse processing can be performed, for example, in a dedicated processor, a general purpose computer, or a combination.

The plurality of parameters can be two parameters, but is preferably 3 or 4 parameters, but can also be 5 or 6 or more parameters.

As recognized by those skilled in the art, the logic and circuitry for implementing the present method can be designed in many different ways all within the scope of the present invention.

Thus, in a preferred embodiment, the invention provides a method for discriminating an uncontaminated single event pulse from a piled pulse by (a) calculating a plurality of pulse shape description parameters for a plurality of regions of a digitized pulse;

(b) comparing the calculated parameters to parameter criteria for the same regions of an unpiled pulse;

(b) accepting the pulse as an uncontaminated single event pulse if the calculated parameters satisfy the parameter criteria and rejecting the pulse if the calculated parameters do not satisfy the parameter criteria; and (c) storing the pulse in a first spectral memory bank if the pulse is accepted. The pulse can be stored in a second, third, or ($n^{th}$+1) spectral memory bank if the calculated parameter does not meet the criteria, or immediately rejected.

Also in preferred embodiments, the method comprises the following steps:

(a) sensing the pulse;

(b) digitizing the pulse;

(c) calculating a parameter from a region of the pulse;

(d) comparing the calculated parameter to a criteria from the same region of at least one known, non-piled pulse;

(e) accepting and storing the pulse in a first spectral memory bank if the calculated parameter meets the criteria; and (f) rejecting and storing the pulse in a second, third, or ($n^{th}$+1) spectral memory bank if the calculated parameter does not meet the criteria.

Clearly, the above process can be varied. For example, preferably a plurality of parameters are calculated and compared. The parameter calculations can all be performed and then all comparisons performed, or each parameter can be calculated and compared in turn, or in combinations. Also, calculation and comparison of one or more parameters can be optional. For example, the parameter(s) can be utilized only in cases where previous comparison of a different parameter(s) provides an ambiguous result on whether a pulse should be accepted or rejected. This would occur, for example, where the acceptance/rejection criteria utilized two different thresholds, leaving a range where a pulse is neither accepted nor rejected. Also, in the exemplary process above, step (f) is optional. Instead of storing a rejected pulse in a secondary spectral memory bank, the pulse can be discarded immediately. Also, the pulse region for calculating a parameter can be selected to be of various widths. Further, the range of acceptable values for a parameter can be adjusted as desired, e.g., based on empirical determination of variability with un-piled pulses for that parameter for a particular analysis.

In another aspect of the present invention, a pulse processor is provided. It comprises a pulse sensor for sensing pulses and an analog-to-digital converter that digitizes the sensed pulses into discrete ADC values over a plurality of time slices. A first storage medium stores the digitized pulses. A classification processor comprises means for calculating at least one parameter from the time slices in at least one region of the pulses and means for comparing the calculated parameter to criteria from the same region of at least one known, non-piled pulse. The processor further comprises a first spectral memory bank for storing accepted pulses whose calculated parameters meet the criteria; and a second, third, or ($n^{th}$+1) spectral memory bank for storing rejected pulses whose calculated parameters do not meet the criteria. The pulse processor can be incorporated in an analyzer system, e.g., a neutron activation analyzer system, such as a PGNAA analyzer. More generally, the pulse processor (and the method described herein) can also be incorporated in any analyzing system that requires the processing of single events that suffer multiple event pileup or overlap. These include, without limitation, (1) nuclear gauges and devices utilizing X-rays or Gamma rays, measuring density, thickness, weight, composition and/or spectra, wherein the sensed radiation occurs randomly in time and inherently generates pulse pileup, and (2) sonar or radar applications wherein normal single event reflections can suffer overlap and pileup due to interfering reflections.

The method and processor indicated above and described herein can be utilized in many different applications and analysis systems, Thus, in another aspect, the invention provides an analyzer, for example, a Prompt Gamma Neutron Activation Analysis (PGNAA) analyzer which includes a pulse processor and/or utilizes the pulse processing method as indicated in the preceding aspects and described herein. The analyzer may be of many different types and configurations, e.g., including systems as described in patents cited herein, as well as in other nuclear spectroscopy systems, among other applications.

In related aspects, the invention provides other analyzers or devices or methods which incorporate the method or processor of this invention in which a single event signal or pulse can be piled or contaminated by other single event pulses, and/or in which a detected reflected electromagnetic signal can be contaminated by secondary reflections. Examples of the latter include sonar and radar applications. In connection with sonar and radar, as well as other applications, the signal is typically a stream or signal of several or many wave periods (the signal thus comprises a plurality of waves). The present analysis method can be applied in such contexts by analyzing the signal wave by wave by comparison of wave portion parameters between a detected signal and an uncontaminated signal.

Objects and advantages of the present invention include any of the foregoing, singly or in combination. Further objects and advantages will be apparent to those of ordinary skill in the art, or will be set forth in the following disclosure.

BRIEF DESCRIPTION OF THE DRAWINGS

The present invention is described with reference to the accompanying drawings. In the drawings, like reference numbers indicate identical or functionally similar elements.

DETAILED DESCRIPTION OF EXEMPLARY EMBODIMENTS

Figure 5:
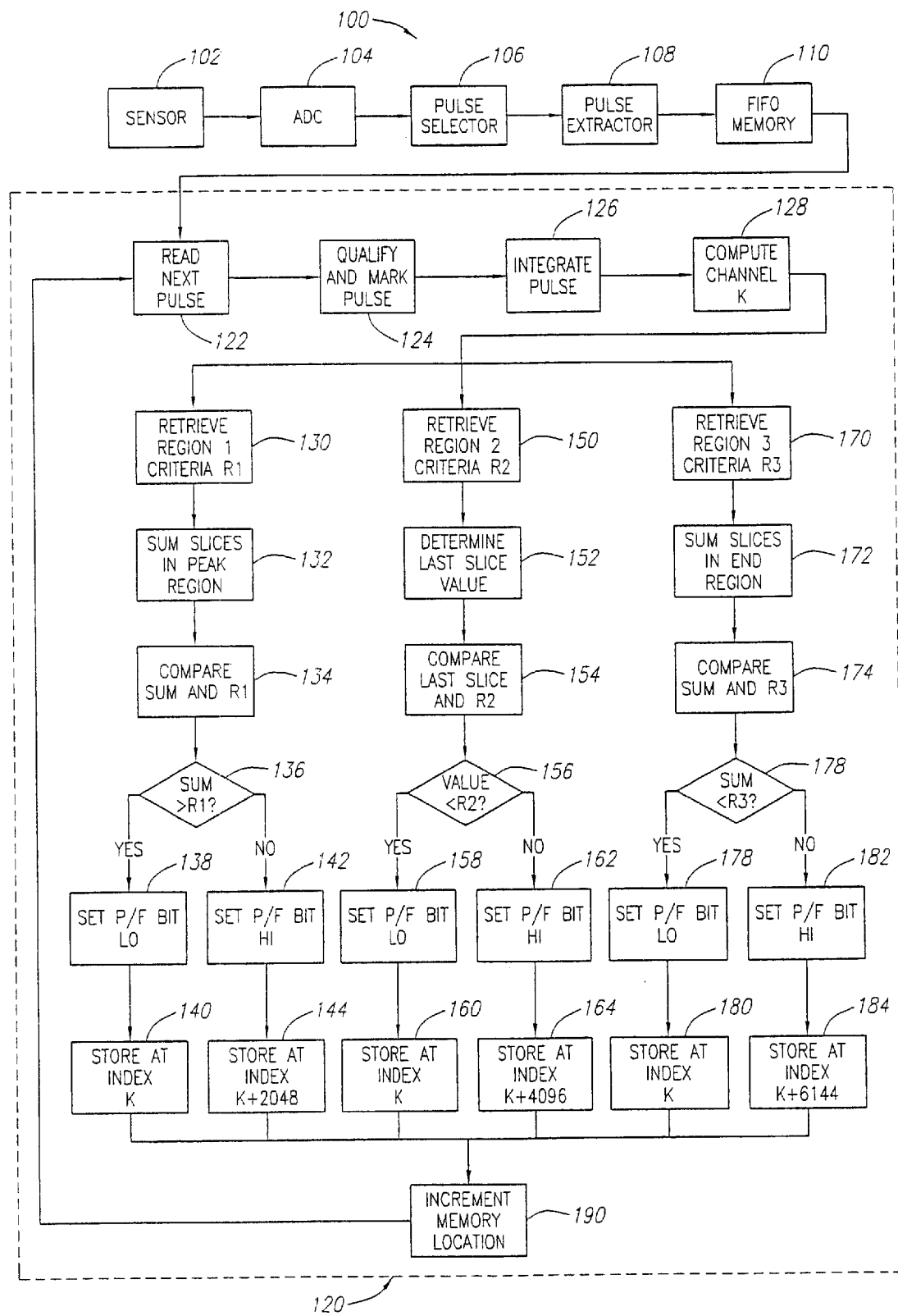
FIG. 5 is a block diagram of a multi-parameter pileup rejection apparatus according to the present invention.

A pulse processor 100 employing multi-parameter pileup rejection techniques according to the present invention is depicted in FIG. 5. A sensor or detector 102 generates an analog data stream of pulse events. In one implementation detector 102 is a sodium iodide detector that generates an analog stream of gamma ray data having an energy level of 0–10 MeV. Analog-to-Digital Converter (ADC) 104 then digitizes the pulse events. An ADC speed family having a sampling frequency or digitizing rate that yields 15–50+ digitized samples or time slices over a pulse integration or processing period is preferred. If the integration period is 400 ns, for example, an ADC operating at 80 MHz will digitize at 12.5 ns per sample and thereby provide 32 samples over the integration period. The maximum rating for this family may be 100 MHz.

Figure 6:
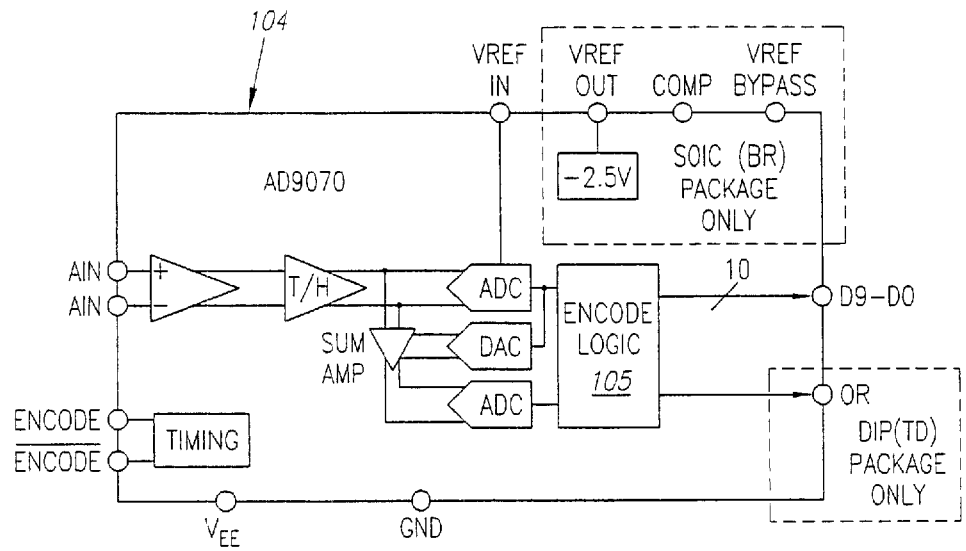
FIG. 6 is a block diagram of an ADC that may be incorporated in the apparatus of FIG. 5.

An ADC 104 that generates an adequate number of digitization bits over the amplitude range of the analog pulse is selected from the preferred speed family. A 10-bit ADC, for example, provides an amplitude range of 1024 digitization bits (0 to 1023). FIG. 6 is a block diagram of one implementation of a 10-bit ADC 104. The analog pulse stream is provided to ADC 104 as differential inputs AIN and $\overline{\text{AIN}}$. ADC 104 outputs ten digitized bits D9–D0, representing an amplitude range 0–1023. A 50–100 MHz oscillator drives the encode logic block 105. ADC 104 illustrated in FIG. 6 is available as product number AD9070 from Analog Devices, One Technology Way, P.O. Box 9106, Norwood, Mass. 02062.

Figure 7:
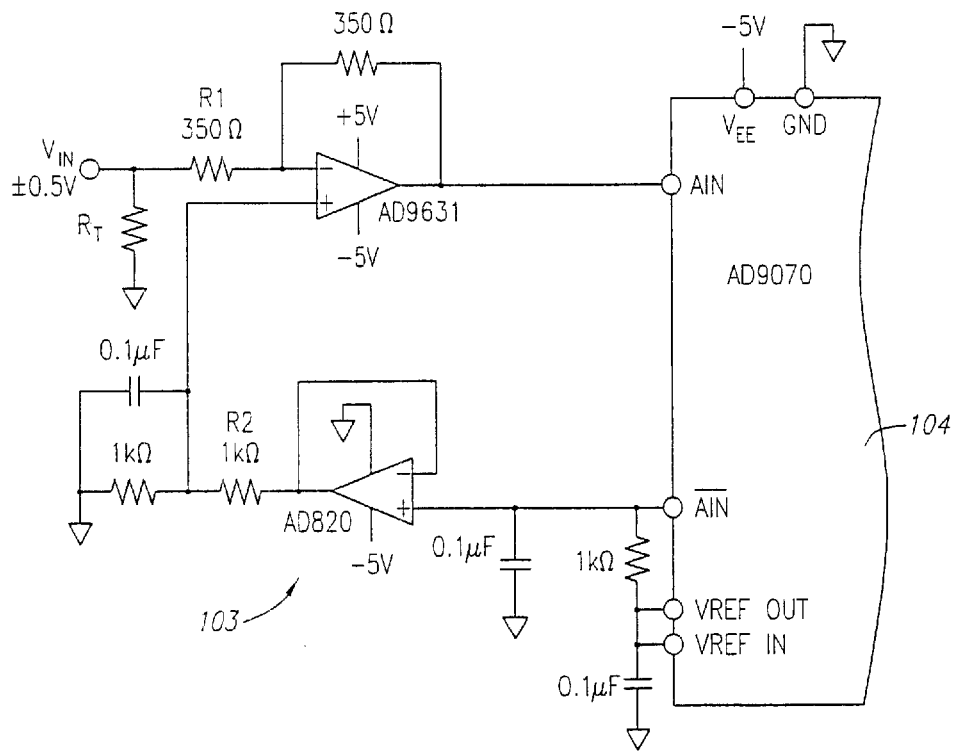
FIG. 7 is an operational amplifier circuit for driving the ADC of FIG. 6.

ADC 104 is driven by an operational amplifier circuit 103 that drives the analog pulse input (AIN, $\overline{\text{AIN}}$) over its rated range, and as its required common mode voltage. FIG. 7 shows a suitable operation amplifier circuit 103 connected to drive ADC 104. Circuit 103 is also available from Analog Devices. It includes an operational amplifier AD9631 that drives the pulse input AIN over its rated range, and an operational amplifier AD820 that provides level shifting to drive pulse input $\overline{\text{AIN}}$ over its rated range. The resistance values of R1 (350 Ω) and R2 (1 kΩ) are based on an input voltage $V_{IN}$ of ±0.5 volts. For an input voltage of 0–4 volts, R1 is changed to 1400 Ω and R2 is changed to 562 Ω. Further detail about the operation of ADC 104 and amplifier circuit 103 is available from Analog Devices, Product Datasheet AD9070.

Figure 2A:
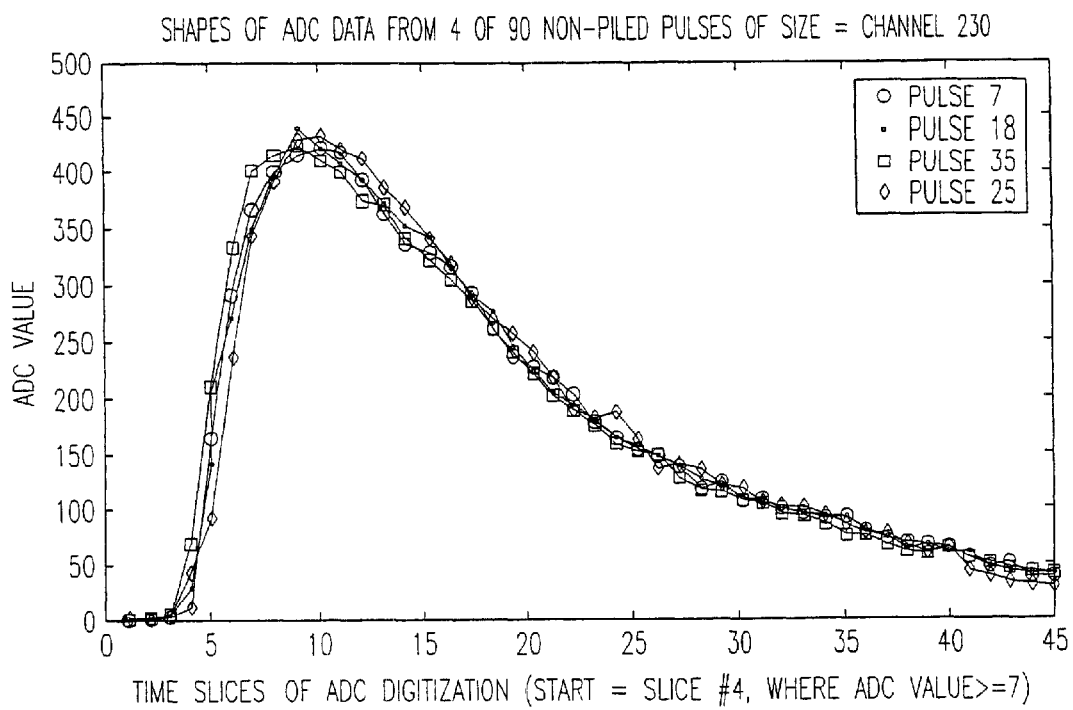
FIG. 2a is an ADC value versus time plot of digitized data generated by an Analog-to-Digital Converter (ADC) for four pulses.

FIG. 2a plots the digitized data generated by ADC 104 for four pulses 7, 25, 18 and 35. The x-axis represents the ADC digitization time, in units of time slices; and the y-axis represents the ADC value (of a possible range of 0–1023). The start of each pulse is defined as the point where the ADC value is greater than or equal to 7. In FIG. 2a, this corresponds to time slice number 4. Each pulse is integrated over 32 slices (4:35) and is stored in histogram memory channel 230.

Each of the pulses 7, 18, 25 and 35 has the same size, integral and energy. The ADC values at any specific time slice, however, manifest dispersions. One or more of the following factors causes these dispersions:

(a) asynchronicity between the ADC clock and the arrival of pulses from sensor 102;
(b) the statistical nature of the time-dependent output of sensor 102 (which, in one implementation, is generated by a scintillation crystal);
(c) a finite amount of differential non-linearity; and
(d) noise associated with the ADC electronics.

Figure 2B:
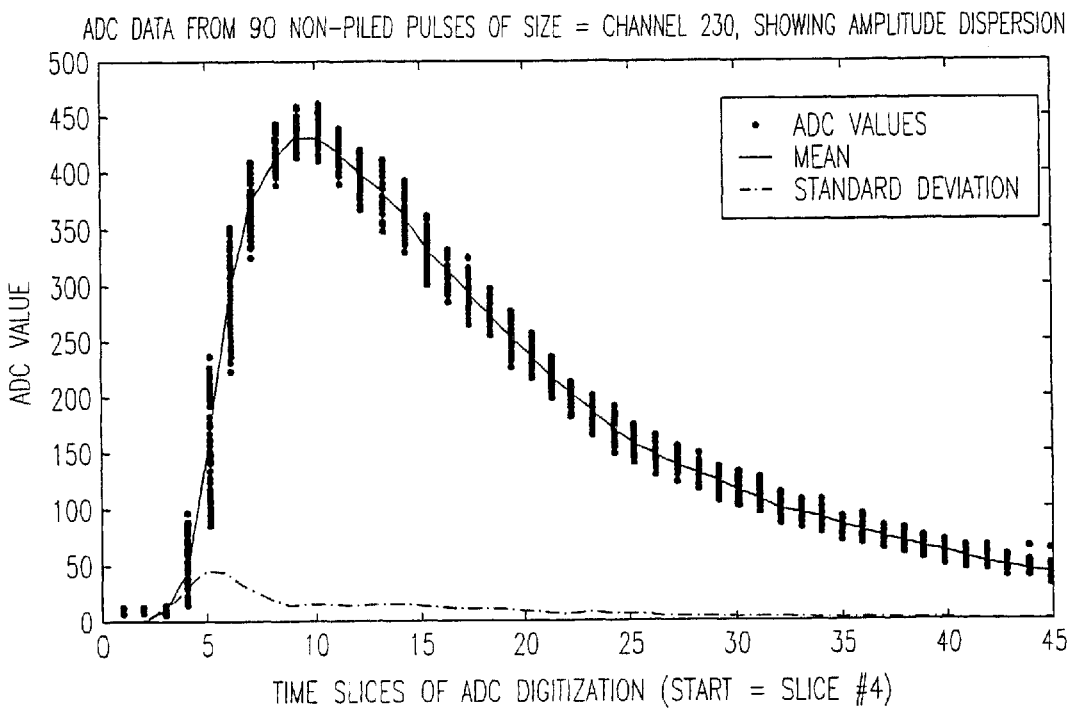
FIG. 2b is an ADC value versus time plot of amplitude dispersion for ninety single (non-piled) pulses.

FIG. 2b plots the amplitude dispersion about each time slice for ninety single (non-piled) pulses. The primary contributing factor of dispersion at the leading edge of the pulses is typically a lack of synchronicity between the ADC clock and pulse arrival, whereas the primary contributing factor from the peak to the tail end of the pulse is usually the statistical nature of the sensor output. The mean and standard deviation of ADC values vs. time slices are also plotted. Shape criteria used to reject piled pulses must include a tolerance for these natural dispersions occurring in non-piled pulses, otherwise, normal, non-piled pulses might be rejected. Appropriate tolerance (or ranges) for a pulse shape parameter can be set by using the range observed for a large number of non-piled pulses.

Digitized pulses output by ADC 104 are next processed by Random Data Processor (RDP) logic comprising pulse selector 106 and pulse extractor 108. Pulse selector 106 qualifies pulses for proper amplitude range and verifies that all remnants of prior pulses have decayed to a nominal baseline value. Pulse extractor 108 copies pulses from the real-time data stream and inserts them into FIFO memory 110. Hence, FIFO memory 110 stores only qualified pulses. The non-event baseline space, which comprises the majority of real-time, is not stored by FIFO memory 110.

Classification Processor (CP) 120 is a system of digital logic that processes pulses previously digitized and prepared by the Random Data Processor (RDP) logic and stored in FIFO memory 110. CP 120 is illustrated in block form in FIG. 5 and schematically in FIGS. 9a–9d.

CP 120 reads pulses in sequential order from FIFO memory 110 at block 122. For each pulse read, the first act of CP 120 is to qualify and mark the start of the pulse (block 124). Essentially, this involves confirming that the last pulse has decayed back to baseline level before processing the next pulse. This fundamental and important step avoids pulse contamination at the start. One preferred implementation of qualifying and marking block 124 is a logic control or state machine that uses two ADC level comparators C1 and C2 and two integer levels A1 and A2. A1 is the average baseline level of the data stream between pulses, and A2 is a trigger level that signals the start of a new pulse. A2 is preferably set to A1 plus 3 to 5 times the standard deviation of fluctuations of the baseline level, or to the level of the smallest pulse of interest, whichever is greater. This insures that each new pulse is amplitude qualified and not simply noise.

Figure 10:
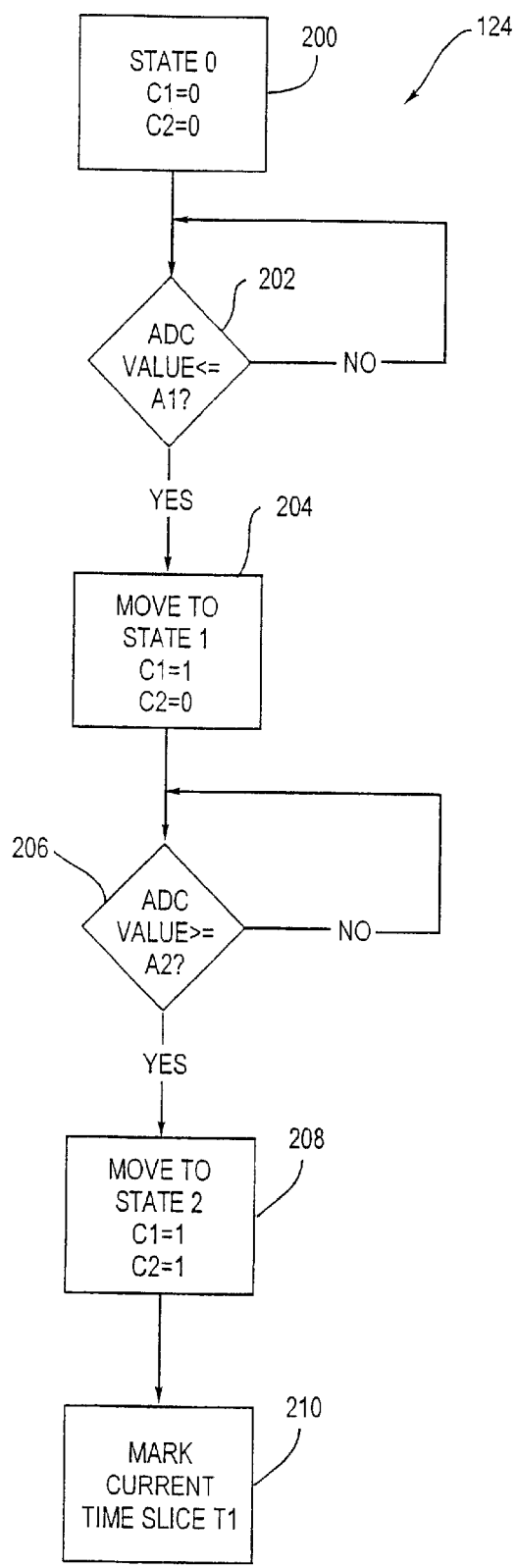
FIG. 10 is a flowchart illustrating a pulse qualifying and marking process according to the present invention.

The logic control or state machine is implemented such that C1 goes high when the current ADC value falls to or below the baseline level A1 (signaling the end of the last pulse), and such that C2 goes high when the current ADC value rises to or above the trigger level A2 (signaling the start of a new pulse). FIG. 10 is a flowchart illustrating the qualifying and marking process. The home or rest state is defined as state 0 (step 200). Comparators C1 and C2 are both low (logical 0) in state 0. CP 120 enters state 0 after the last time slice of the previous pulse has been read and processed. In state 0, CP 120 verifies that the previous pulse has completely decayed by monitoring the current ADC level (step 202). When the ADC level falls to or below the baseline level A1, CP 120 recognizes that the previous pulse has completely decayed by moving to state 1 (step 204). In state 1, comparator C1 is set to high (logical one), while C2 remains low.

Once it has been established that the previous pulse has completely decayed. CP 120 begins monitoring the current ADC level for the start of a new pulse (step 206). When the ADC level rises to or above the trigger level A2, CP 120 recognizes the start of a new pulse by moving to state 2 (step 208). In state 2, both comparators C1 and C2 are set to high. The pulse time slice causing the move to state 2 is marked as T1 (time slice number 1) and defines the beginning of a new pulse integration period.

Figure 8:
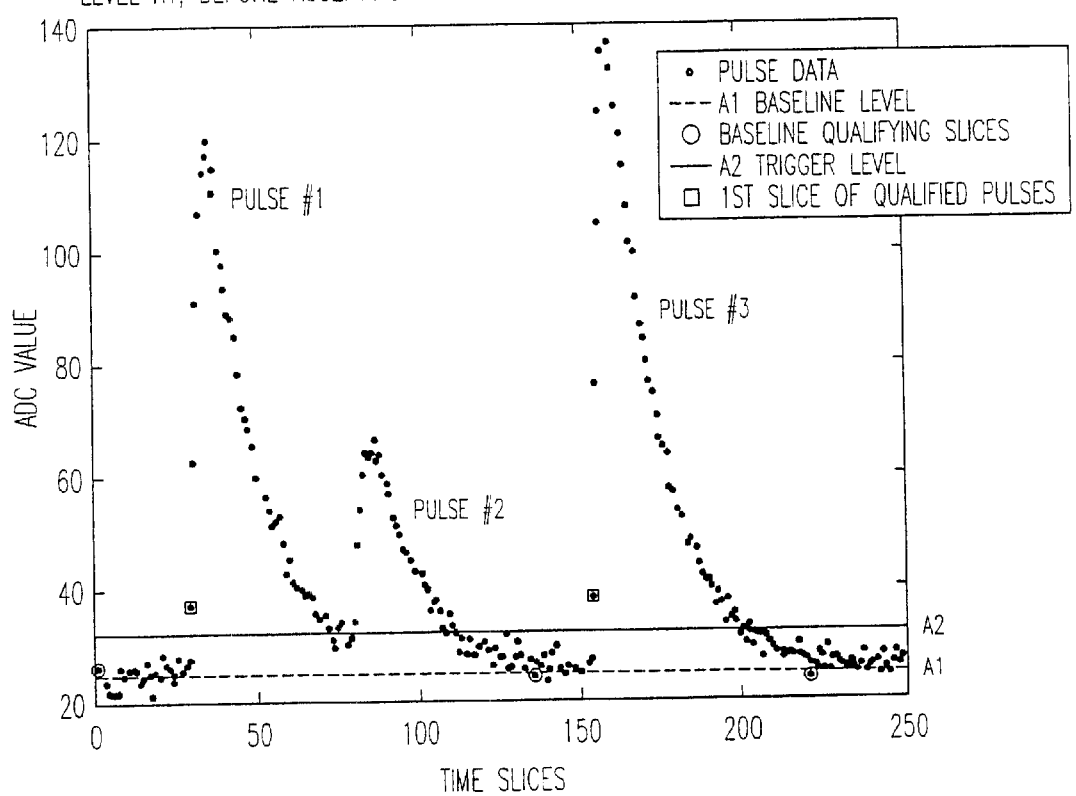
FIG. 8 is a time plot illustrating application of a qualifying and marking process according to the present invention to three sample pulses.

FIG. 8 illustrates pulse qualification and marking for three sample pulses 1, 2 and 3. The baseline level A1 is set at an ADC value of approximately 25 and the trigger level A2 is set at an ADC value of approximately 32. First, pulse 1 is considered. At approximately time slice 0, the ADC value of pulse 1 falls below the baseline level A1 to trigger state 1 and, at approximately time slice 30, the ADC value of pulse rises above the trigger level A2 to trigger state 2. Hence, pulse 1 is qualified or accepted and time slice 30 (approximate) is marked T1. Pulse 2 is now considered. It can be seen that the ADC value between pulses 1 and 2 never fully decays below the baseline level A1. Hence, CP 120 never enters state 1 and pulse 2 is rejected (not processed). Hence, qualifying and marking block 124 removes from consideration those pulses displaying overtly obvious signs of pileup, such as a failure to decay to the baseline level. CP 120 remains in state 0 for the duration of pulse 2, until the ADC value finally falls below the baseline level A1 at approximately time slice 135. At approximately time slice 155, the ADC value rises above the trigger level A2, thereby qualifying pulse 3. This time slice is marked T1 and pulse 3 is processed.

With a pulse qualified and T1 defined, the pulse data is examined for pileup over an integration or processing period. The last time slice of the processing period is defined as TE. Hence, the pulse data is evaluated over the time slice interval T1–TE. Once a pulse is read from FIFO memory 110, qualified and marked, integrator 126 determines the area (integrates) the pulse in the time slice interval T1–TE. In one implementation, this is accomplished by subtracting a fixed baseline value (typically 25) from the ADC value of each time slice, and then summing the ADC values of slices T1–TE. Next, channel converter 128 generates a channel number k by dividing the sum of the ADC values by the number of slices summed, and truncating the result.

Figure 1A:
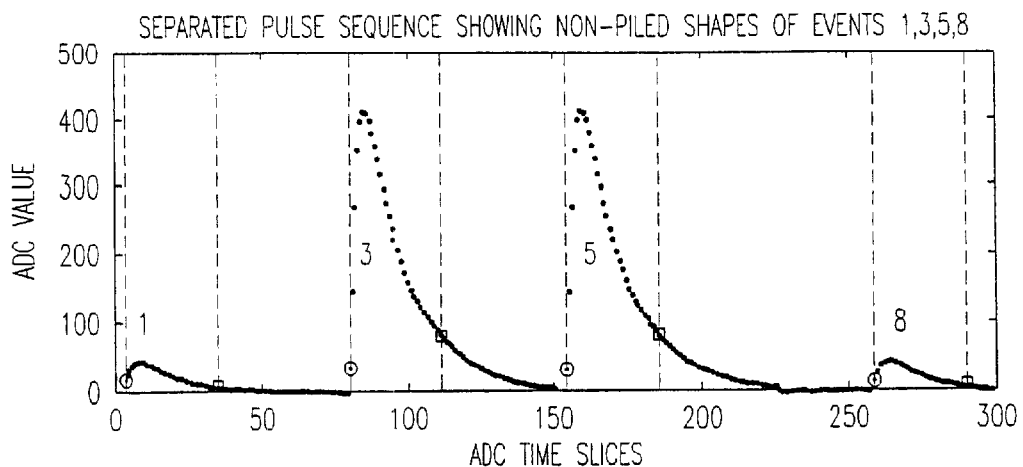
FIG. 1a is an ADC value versus time plot for a first group of four digitized pulses.
Figure 1B:
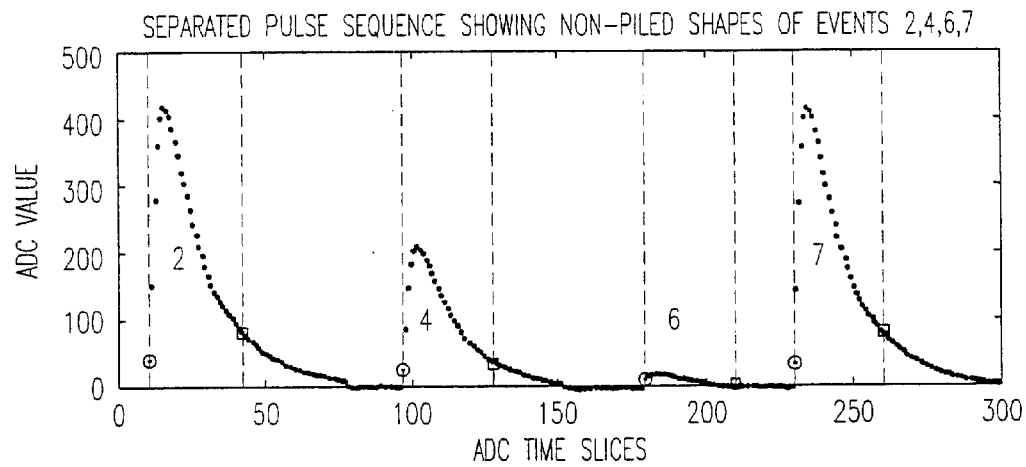
FIG. 1b is an ADC value versus time plot for a second group of four digitized pulses.
Figure 3A:
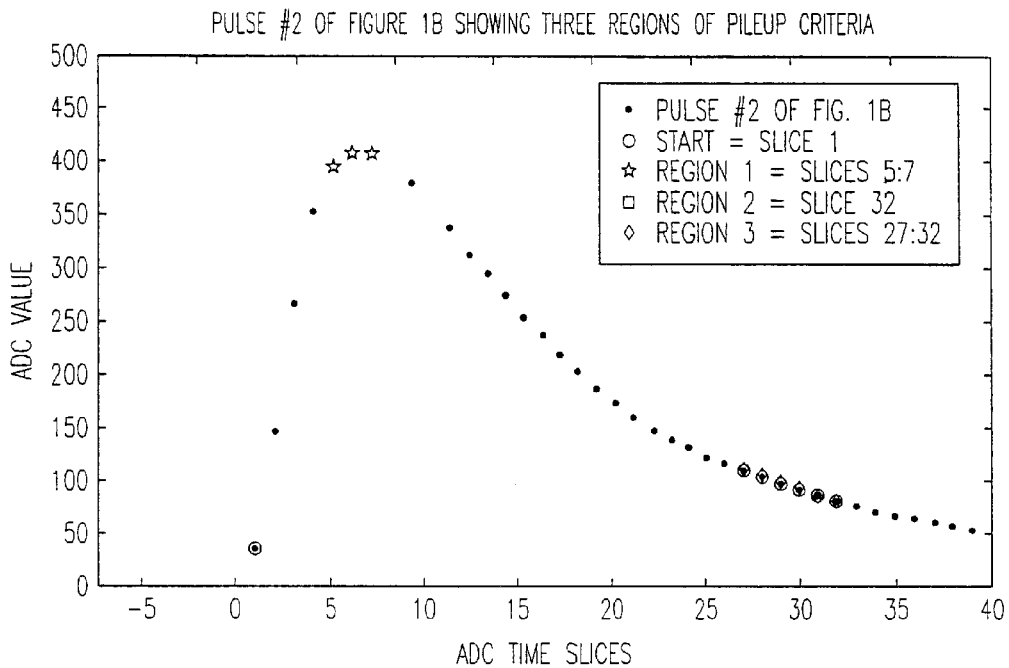
FIG. 3a is an ADC value versus time plot showing analysis regions for pulse 2 of FIG. 1b.
Figure 3B:
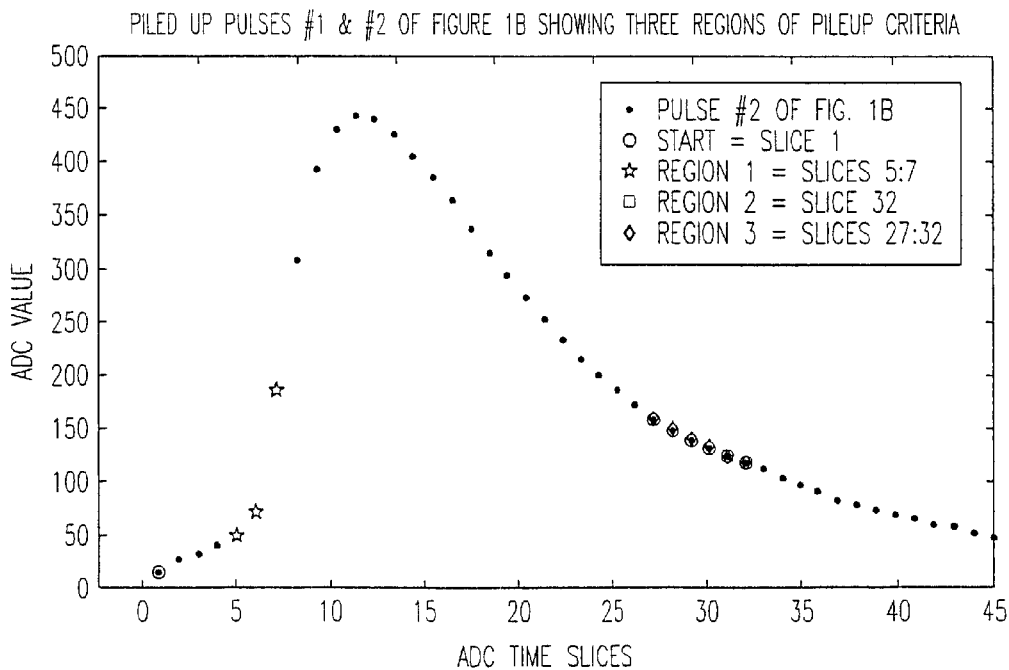
FIG. 3b is an ADC value versus time plot showing analysis regions for pile-up pulse 1,2 of FIG. 1c.

Broadly speaking, the pulse data is analyzed for contamination or pileup by dividing each pulse into multiple regions and comparing a parameter calculated from the actual pulse data in that region to a standard valuation of that parameter calculated from known, nonpiled pulse data. FIG. 3a is a more detailed plot of the pulse data from pulse 2 of FIG. 1b, and FIG. 3b is a more detailed plot of the pulse data from piled pulse 1,2 of FIG. 1c. These pulse patterns represent gamma ray data generated from a sodium iodide detector and having energy in the range of 0–10 MeV. The pulse pattern data is divided into three regions for analysis:

(1) Region 1 is the peak of the pulse. In this implementation, region 1 is defined as time slices T5–T7.

(2) Region 2 is the very end of the pulse. In this implementation, region 2 is defined as the last time slice TE.

(3) Region 3 is the end portion of the pulse. In this implementation, region 3 is defined the last n time slices TE-n-1 to TE.

Various parameters in each region may be calculated and analyzed. In general, one skilled in the art would empirically compare examples of unpiled and piled pulses for a particular type of analysis and analyzer, and determine which selections would give the best discrimination between the pulses individually and in combination. Additionally, the processing time required for utilization of particular sets of parameters could be considered, particularly for on-line, real-time analysis, e.g., for real-time process control. Examples of parameters that might be considered and utilized include simple summing parameters, i.e. $a=\Sigma y$; slope parameters, i.e. $y=ax+b$; second-degree polynomial parameters, i.e. $y=ax^2+bx+c$; third-degree degree polynomial parameters, i.e. $y=ax^3+bx^2+cx+d$; and exponential parameters, i.e. $y=ae^{-hx}$. In these equations, y represents the ADC values over the time slice region, and x represents the particular time slice number. Parameters other than those listed might be used to analyze pulse data and are within the scope of the present invention. A means is chosen to compute the parameters selected over the time slice regions defined. The means can range from off-line computing equipment which captures a data stream for subsequent analysis by a digital signal processor, to high speed pipelined accumulators, multipliers, dividers, subtractors, and other digital arithmetic elements and logic controlled by state machines which can operate in real-time.

For illustrative purposes, the three regions defined with reference to FIGS. 3a–b are analyzed using a simple sum parameter, $a=\Sigma y$. Before analysis of actual pulse data, standard valuation criteria are calculated for each region and stored in memory for later comparison with actual pulse data. The standard valuation criterion for each region is the benchmark used to pass or fail actual pulse data in that region. The standard valuation criteria for regions 1–3 are designated R1, R2 and R3. Each criteria is computed as the average of the sum of i time slices over a large set of j single event, known to be non-piled pulses (j=1:100). This criteria is calculated for each energy bin or channel k, where k=1:500. For this example, k represents a range of 0 to 11 MeV.

The region 1 criterion R1 is calculated as follows. The mean M1(k) and standard deviation S1(k) for region 1 are computed as:

$$M1(k)=mean(sum(y(i,j,k))); \text{ and}$$

$$S1(k)=standard\_deviation(sum(y(i,j)));$$

where i represents time slice numbers 5–7, j represents non-piled pulses 1–100, and k is the energy channel number 1–500. From the mean and standard deviation, region 1 criterion R1 can be expressed as:

$$R1(k)=M1(k)-N1 \cdot S1(k);$$

where N1 is a multiple of standard deviation S1(k) chosen to avoid rejecting or failing single event pulses whose shape falls outside normal statistical probability. Typically, N1 is in the range of 3 to 5. If N1=3, for example approximately 0.5% of all Single Event pulses will fail.

For a pulse in energy channel k to pass the first region criteria R1(k) in this summing parameter scenario, the sum of time slices 5, 6 and 7 of the pulse must be greater than or equal to R1(k).

The region 2 criterion R2 is calculated as follows. The mean M2(k) and standard deviation S2(k) for region 2 are computed as:

$$M2(k)=mean(sum(y(i,j,k))); \text{ and}$$

$$S2(k)=standard\_deviation(sum(y(i,j)));$$

where i=32 or the last time slice, j represents non-piled pulses 1–100, and k is the energy channel number 1–500. From the mean and standard deviation, region 2 criterion R2 can be expressed as:

$$R2(k)=M2(k)+N2 \cdot S2(k);$$

where N2 is a multiple of standard deviation S2(k) chosen to avoid rejecting or failing single event pulses whose shape falls outside normal statistical probability. Typically, N2 is in the range of 3 to 5. If N2=3, for example approximately 0.5% of all Single Event pulses will fail.

For a pulse in energy channel k to pass the second region criteria R2(k) in this summing parameter scenario, the value of the last time slice (time slice 32 in this example) must be less than or equal to R2(k).

The region 3 criterion R3 is calculated as follows. The mean M3(k) and standard deviation S3(k) for region 3 are computed as:

$$M3(k)=mean(sum(y(i,j,k))); \text{ and}$$

$$S3(k)=standard\_deviation(sum(y(i,j)));$$

where i represents time slice numbers 27–32, or the last six time slices of the pulse interval, j represents non-piled pulses 1–100, and k is the energy channel number 1–500. From the mean and standard deviation, region 3 criterion R3 can be expressed as:

$$R3(k)=M3(k)+N3 \cdot S3(k);$$

where N3 is a multiple of standard deviation S3(k) chosen to avoid rejecting or failing single event pulses whose shape falls outside normal statistical probability. Typically, N3 is in the range of 3 to 5. If N3=3, for example approximately 0.5% of all Single Event pulses will fail.

For a pulse in energy channel k to pass the third region criteria R3(k) in this summing parameter scenario, the sum of the last six time slices 27–32 of the pulse must be less than or equal to R3(k).

Figure 4:
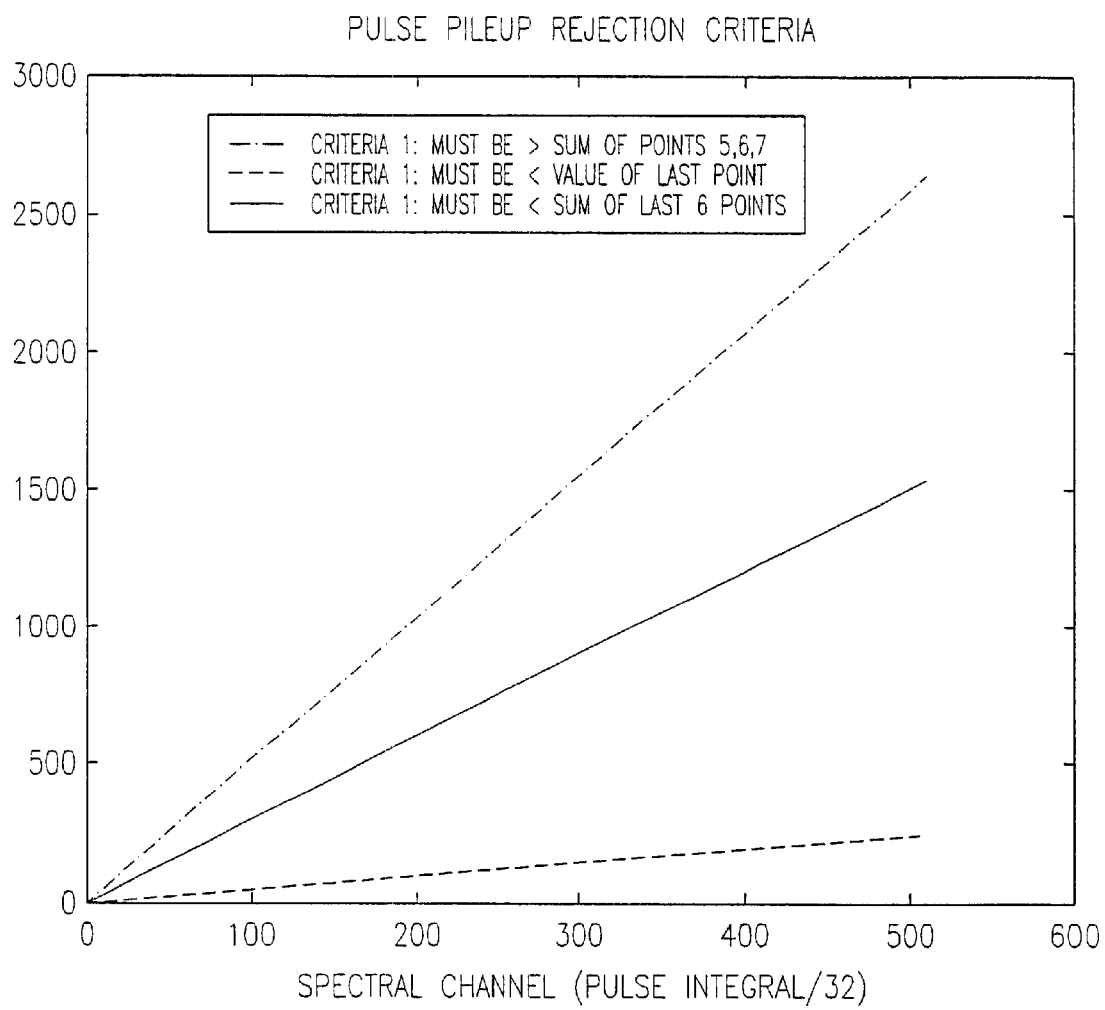
FIG. 4 is an ADC value versus spectral channel plot of parameter criteria for three pulse regions.

FIG. 4 plots each of the three criteria versus channel numbers 1–500. Again, the channel number is calculated by dividing the pulse integral (sum of time slices 1–32) by 32 and truncating the result to an integer. As can be seen, criteria R1 for region 1, the sum of time slices 5–7, ranges from zero to approximately 2600 over the 500 channels. To pass the region 1 criteria, the sum of time slices 5–7 for an actual pulse must be $\geq$criteria R1. Criteria R2 for region 2, the value of the last time slice, ranges from zero to approximately 200 over the 500 channels. To pass the region 2 criteria, the value of the last time slice must be $\leq$criteria R2. Criteria R3 for region 3, the sum of the last six time slices 27–32, ranges from zero to approximately 1500 over the 500 channels. To pass the region 3 criteria, the sum of the last six time slices must be $\leq$criteria R3.

Referring again to FIG. 5, CP 120 performs three pileup rejection tests on each qualified, marked and integrated pulse. The tests correspond to the three pulse regions and parameters discussed above. The criteria for each region are computed as described above. Again, it should be appreciated that different parameters may be used to compute the criteria (i.e. parameters other than a simple sum) and different pulse regions may be defined. The parameters and regions selected for analysis may vary depending on the application and pulse shape characteristics.

The first pileup rejection test is initiated by retrieving from memory the first region criteria R1(k) (step 130). R1(k) is stored in a memory bank location indexed by the channel number k+16384+2048. In step 132, the net sum of time slices 5–7 of the actual pulse data is computed. In computing the net sum, a fixed baseline value is subtracted from the ADC value of each time slice. The baseline value is programmable and is typically in the range of 10 to 100, typically 25. Moreover, the time slice range to be summed is programmable, typically over a range of time slices 4–8.

In step 134, the net sum is compared to the value of retrieved criteria R1(k). The net sum must be greater than or equal to R1(k) to accept or "pass" the pulse event (step 136). If, based on the comparison, the pulse event is acceptable, a pass/fail bit is set to low or logical zero (step 138). Based on the value of this bit (low), a bank controller stores the event in a histogram memory bank section (by incrementing a memory location 190) indexed by the channel number k (step 140). Conversely, if the pulse event is not acceptable, the pass/fail bit is set to high or logical one (step 142). Based on the value of this bit (high), the bank controller stores the event in a histogram memory bank section 190 indexed by the channel number k+2048 (step 144).

The second pileup rejection test is initiated by retrieving from memory the second region criteria R2(k) (step 150). R2(k) is stored in a memory bank location indexed by the channel number k+16384+4096. In step 152, the net value of the last time slice is determined. A fixed, programmable baseline value, typically in the range of 25, may be subtracted from the ADC value of the time slice. Moreover, the number of the last time slice is programmable; in this example the last time slice is 32.

In step 154, the value of the last time slice is compared to the value of retrieved criteria R2(k). The value must be less than or equal to R2(k) to accept or "pass" the pulse event (step 156). If, based on the comparison, the pulse event is acceptable, a pass/fail bit is set to low or logical zero (step 158). Based on the value of this bit (low), a bank controller stores the event in a histogram memory bank section 190 indexed by the channel number k (step 160). Conversely, if the pulse event is not acceptable, the pass/fail bit is set to high or logical one (step 162). Based on the value of this bit (high), the bank controller stores the event in a histogram memory bank section 190 indexed by the channel number k+4096 (step 164).

The third pileup rejection test is initiated by retrieving from memory the third region criteria R1(k) (step 170). RJ(k) is stored in a memory bank location indexed by the channel number k+16384+6144. In step 172, the net sum of the last six time slices 27–32 of the actual pulse data is computed. In computing the net sum, a fixed baseline value may be subtracted from the ADC value of each time slice. The baseline value is programmable and is typically in the range of 25. Moreover, the time slice range to be summed is programmable, typically over a range of time slices 2–32.

In step 174, the net sum is compared to the value of retrieved criteria RJ(k). The net sum must be less than or equal to RJ(k) to accept or "pass" the pulse event (step 176). If, based on the comparison, the pulse event is acceptable, a pass/fail bit is set to low or logical zero (step 178). Based on the value of this bit (low), a bank controller stores the event in a histogram memory bank section 190 indexed, by the channel number k (step 180). Conversely, if the pulse event is not acceptable, the pass/fail bit is set to high or logical one (step 182). Based on the value of this bit (high), the bank controller stores the event in a histogram memory bank section 190 indexed by the channel number k 6144 (step 184).

Figure 1C:
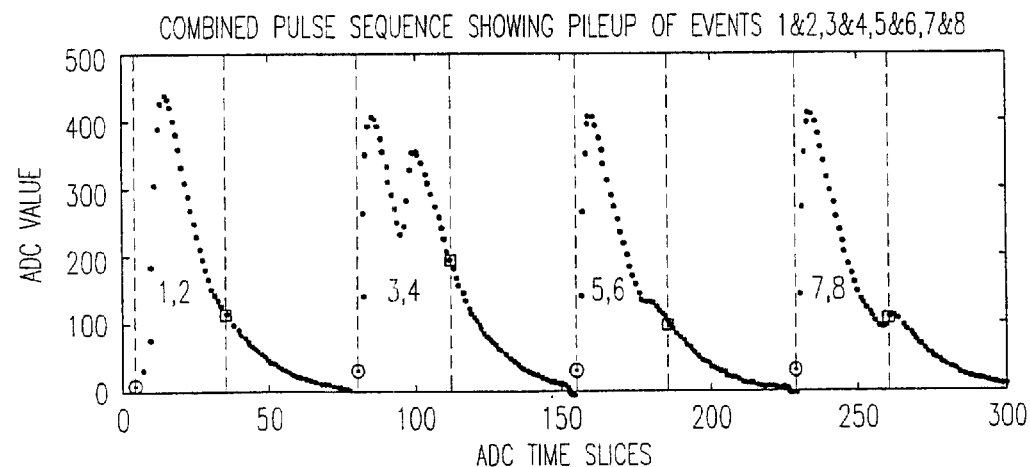
FIG. 1c is an ADC value versus time plot showing pulse pileup between the first and second group of digitized pulses of FIGS. 1a 1b.

The pulse data, rejection criteria and pass/fail results for the four pulse combinations of FIG. 1c, applying the criteria and parameters discussed above, are listed in Table 2. The first column for each criterion lists the pulse combination (1,2; 3,4; 5,6; or 7,8). The second column lists the result of the computation of the pulse integral over time slices 1–32 (in ADC value). The third column lists the computed channel number k (calculated by dividing the pulse integral by 32 and truncating the result to an integer). The fourth column provides the computed parameter from the actual pulse data. For criteria 1, this is the sum of slices 5–7, for criteria 2, it is the value of the last time slice, and for criteria 3, it is the sum of time slices 25–32. The fifth column lists the standard criteria against which the actual pulse data will be judged. Columns 6 and 7 list the pass/fail decision and the margin of passing (+) or failing (−), respectively. Columns 8–11 list the corresponding results from testing an ideal (non-piled) pulse of equivalent energy. Column 12 lists the standard deviation of each criterion.

Notably, not every piled pulse failed each criteria test. Combining the three criteria of each pulse, however, yields a very effective means for piled pulse rejection. A review, of Table 2 confirms that none of the four piled pulses passed all three criteria tests.

Classification processor 120, in one implementation, uses the state machine described with reference to the qualifying and marking step 124 to implement this pulse pileup rejection technique. During state 2, the state machine triggers a set of sequential timers that open gates to allow four digital accumulators to sum the following parameters: the integral over time slices 1–32; criteria 1, the sum of ADC values over time slices 5–7; criteria 2, the ADC value of the last time slice; and criteria 3, the sum of ADC values over the last six time slices 27–32. As mentioned above, depending upon the shape characteristics of the pulses, various parameters and time slice regions can be selected.

Pulse processor 100, apart from sensor 102, may be implemented on a PC card, software or microprocessor. The PC may be provided with associated I/O ports as necessary for data acquisition (i.e. interfaces with the sensor) and data processing, and any necessary application software. The PC, of course, will also be equipped with an operator's console to allow manipulation of the various data and parameters discussed herein. The PC is also typically equipped with at least one output device, usually including a monitor such as a CRT device to allow One implementation of pulse processor 100 is in or associated with a Prompt Gamma Neutron Activation Analysis (PGNAA) analyzer, preferably in an on-line, real-time bulk material PGNAA analyzer. When a PGNAA analyzer is operated with a neutron flux sufficient to provide real-time, on-line analysis (e.g., in cement manufacturing), the percentage of signals that exhibit pulse pile-up becomes significant. Thus, use of the analysis method and processor described herein, e.g., processor 100, is highly advantageous in such analysis environments.

A variety of PGNAA and other neutron activation analyzers and methods associated with such analyzers have been described, e.g., Marshall, U.S. Pat. No. 4,682,043; Christell et al., U.S. Pat. No. 4,028,267; Atwell et al., U.S. Pat. No. 5,732,115; Chen, U.S. Pat. No. 3,748,473; Atwell et al., U.S. Pat. No. 5,396,071; Gozani, U.S. Pat. No. 5,162,096; U.S. Pat. No. 4,582,992; U.S. Pat. No. 5,053,185; U.S. Pat. No. 3,832,545, and the present method and processor can be utilized with any such analyzers as well as others. For example, the pulse analysis methods and/or processors can be used with devices or systems such as those described in Bartko, U.S. Pat. No. 3,832,545; Taylor et al., U.S. Pat. No. 3,781,556; Tittle, U.S. Pat. No. 3,053,388, and Marshall, U.S. Pat. No. 4,171,485; U.S. Pat. No. 4,266,132; and Murray, U.S. Pat. No. 4,428,902. All of the patents cited above are incorporated in their entireties, including drawings.

Further the pulse analysis methods and processors can be used in devices and applications including nuclear gauges and devices utilizing X-rays or Gamma rays, measuring density, thickness, weight, and/or spectra. Generally, these are applications where some percentage of pulses detected will be piled pulses (combined single event pulses) rather than single event pulses. These devices and applications are within the present invention. Non-limiting examples of such devices are described in U.S. Pat. No. 5,532,492, U.S. Pat. No. 5,432,353, U.S. Pat. No. 5,315,124, U.S. Pat. No. 5,266,159, and U.S. Pat. No. 5,151,601.

Also, the pulse analysis methods and processors can be used in devices where single event pulses represent single event signal reflections, but where some single event reflections can be contaminated with interfering reflections generated from the same signal or output. Examples of such applications include, for example, sonar and radar applications. These devices and applications are also within the present invention. As indicated above, the signals in such applications often involve an electromagnetic wave series rather than isolated wave pulses. In such cases, the present invention can also be utilized, for example by performing the analysis on a wave-by-wave basis using one or more, up to all, of the waves in a signal. Non-limiting examples of such devices are described in U.S. Pat. No. 5,905,459, U.S. Pat. No. 5,905,458, U.S. Pat. No. 5,864,515, and U.S. Pat. No. 5,864,391.

FIGS. 9a–9d are detailed circuit schematics of one exemplary implementation of classification processor (CP) 120. It should be recognized that this is just one of many possible implementations of CP 120. Moreover, while the schematics are explained in some detail below, the function and operation of the various circuitry and components in FIGS. 9a–9d will be readily apparent to those of skill in the art.

Figures 1, 9A:
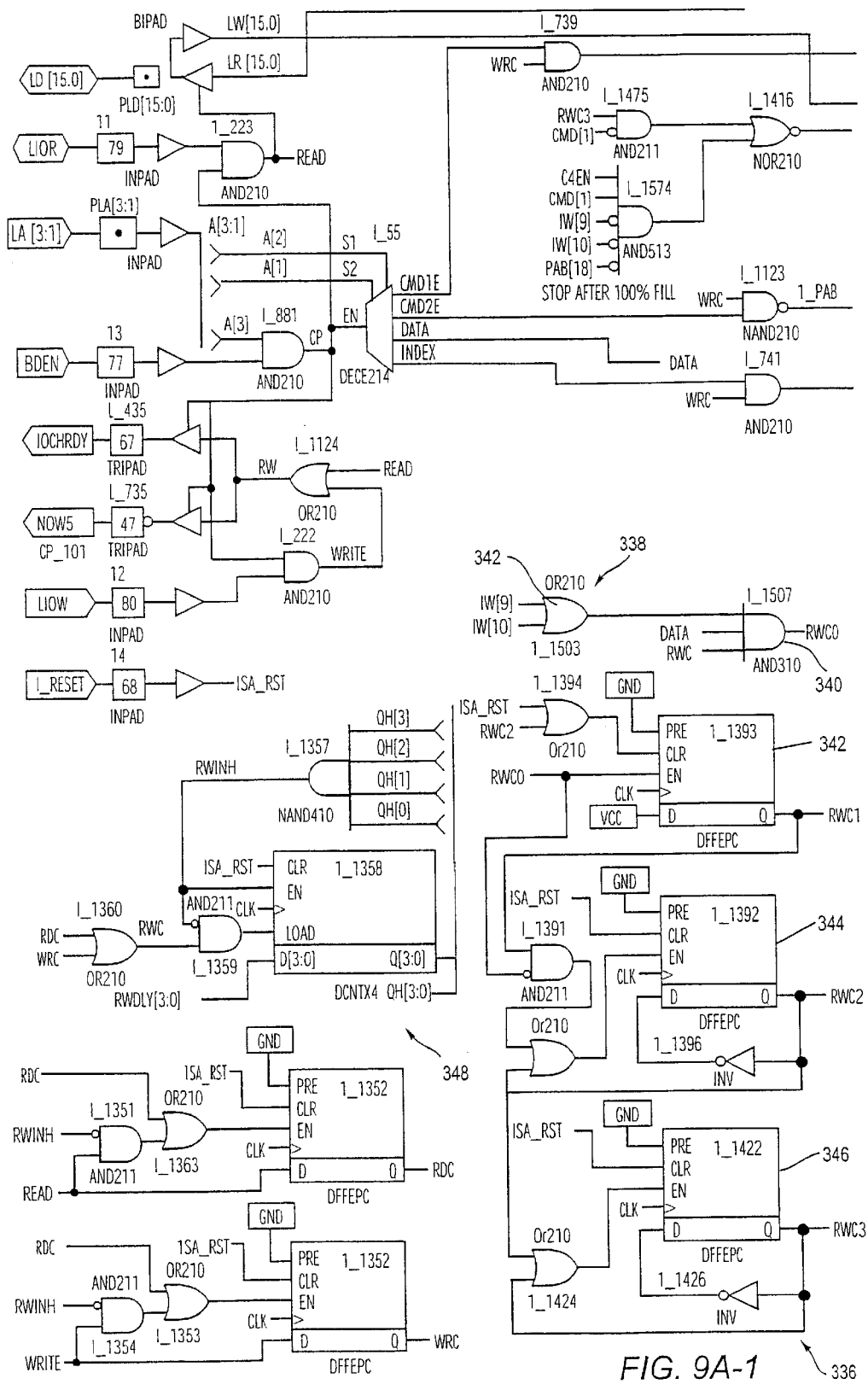
FIG. 9a is a schematic diagram of a first portion of one implementation of a classification processor according to the present invention.
Figures 2, 9A:
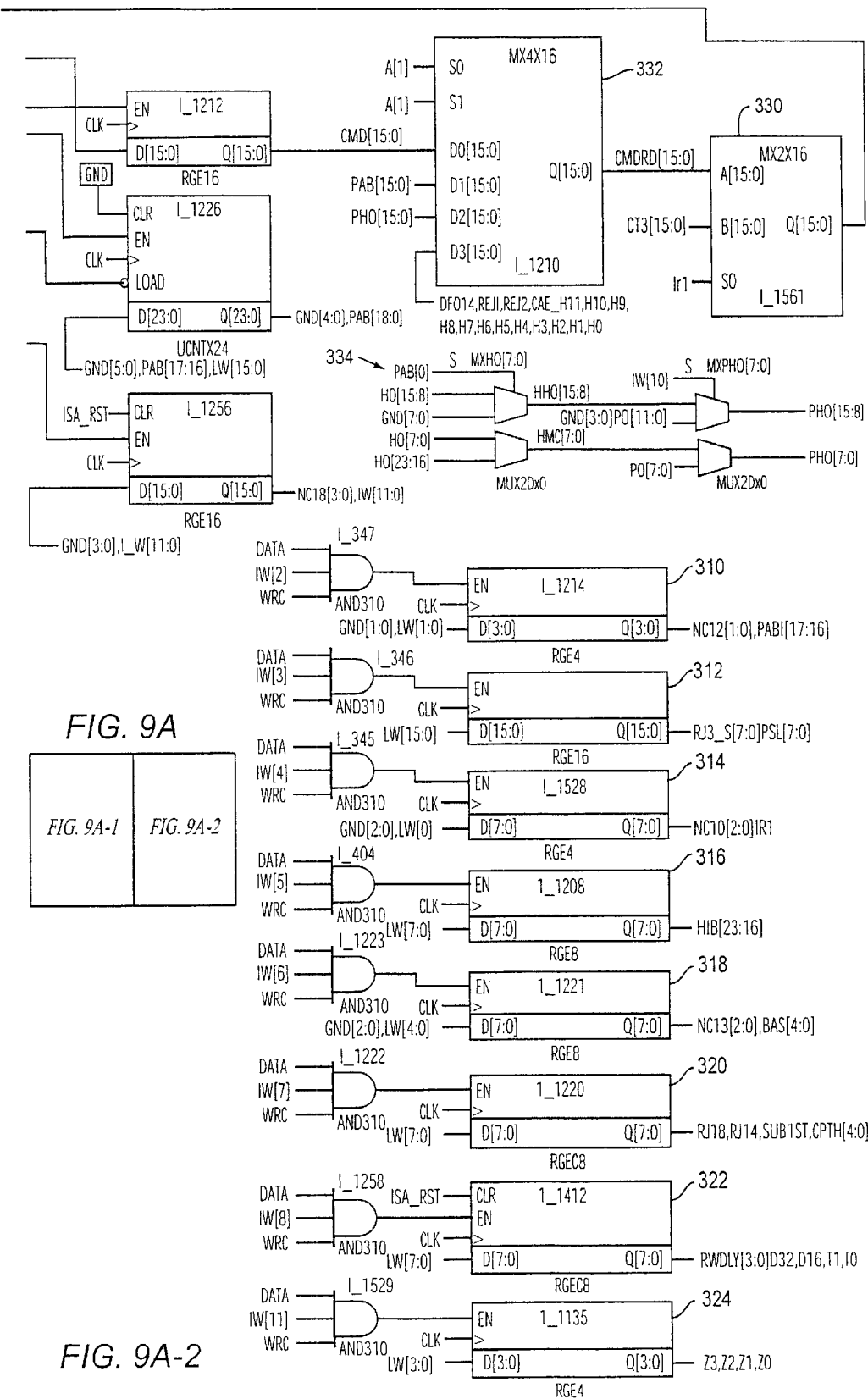

FIG. 9a shows an interface to an ISA bus and control registers. Each board has 16 bytes (eight 16-bit words) of I/O address space. Assuming the board address is A, the first four 16-bit addresses, A-Aα6, are for the RDP chip (Random Data Processor; see description above), and the next four addresses, A+8–A+14, are for the CP chip.

Control Registers

Input Registers

There are four major input registers to CP 120 (FIG. 9a; A3–B5):

1) Command Register: at address A=A+8, the Command Register loads bits CMD[15:0].
2) Manual DAC Input Register: at address A=A+10, the Manual DAC Input Register loads bits PABI[18:0]. This is the register for both the histogram memory and the pulse library memory. The lower 16 bits are loaded from the ISA bus directly and the upper two bits come from the IW[2] register (FIG. 9a; B6).
3) Data Register: at address $A=A+12$, the Data Register loads the secondary registers controlled by bits IW[2:7], IW[8] and IW[11]. The data register also reads and writes both the histogram memory and the pulse library memory, depending upon control bits IW[9] and IW[10], respectively.
4) Index Register: at address $A=A+14$, the index register sets the control register bits IW[10]. As detailed below, the setting of these bits select the secondary register into which data from the Data Register will be loaded. When the IW[5] bit is set, for example writing to address A+12 will load HIB[23:16], which is the register that loads the upper data byte in the 24-bit histogram memory whenever the lower 16 bits of that memory is written from the ISA bus with an IW[9] bit set. As with the RDP, the index registers are selected with the IW control bit in register at A+14. It is important to note that only one bit may be set at any one time. Following is a summary of the settings of the index register bits IW at address A=A=14:

Index Register BIT (IW) Settings a) IW=2^2; register PABI[17:16] is loaded, which is the upper bit address of the pulse library (FIG. 9a at 310).

b) IW=2^3; registers RJ3_S[7:0] and PSL[7:0] are loaded (FIG. 9a at 312). Register RJ3_S[7:0] is loaded with the number of slices integrated (SLI)-1-n, where the last n time slices are summed for comparison with pileup rejection criteria number 3 for a given pulse. The register PSL[7:0] is loaded with SLI-5. Thus, of 32 slices are to be integrated, PSL[7:0] is loaded with 27.

c) IW=2^4, single bit register IR1 is loaded (FIG. 9a at 314). IR1 controls the direction of MUX 330, for the readout of address A+8 onto the ISA Bus of either CMD[15:0] when IR1=0, or CT3[15:0], when IR1=1.

d) IW=2^5; register HIB[23:16] is loaded (FIG. 9a at 316). The value in this register is written to the high order bits of the histogram memory at the time the lower 16 bits are written to A+12, with control bit IW[9] set.

e) IW=2^6; register BAS[4:0] is loaded with the baseline value that CP 120 subtracts from each time slice of the pulse data stream before summing time slices for integration or pulse pileup values (FIG 9a at 318).

f) IW=2^7; registers RJ18, RJ14, SUB1ST and CPTH [4:0] are loaded (FIG. 9a at 320). Register RJ14 determines the time slice number that summing will begin at under criteria 1. RJ14=0 selects time slice 3 to start summing and RJ14=1 selects time slice 4 to start summing. Register RJ18 determines the time slice number that summing will end at under criteria 1. RJ18=0 selects time slice 7 to end summing; and RJ18=1 selects time slice 8 to end summing.

Register SUB1ST, if set, directs the numerical pulse integrator to not add the first time slice of data to the pulse integral sum. This logic appears at 410 of FIG. 9c, generating H3_1 at time H2 if SUB1ST is set. This optional feature may improve resolution due to the large amplitude skew sometimes associated with the first time slice.

Register CPTH[4:0] is the net threshold value above the baseline (i.e., A2) for triggering integration of a new pulse. The time slice whose value is greater than or equal to the value stored in CPTH, is designated time slice 1 or T1 of the integral.

g) IW=2^8; registers RWDLY[3:0], D32, D16, T1 and T2 are loaded (FIG. 9a at 322).

Register RWDYL[3:0] stores the length of the delay that inhibits the READ & WRITE ISA bus signals from generating RDC or WRC commands (see logic section 348, FIG. 9a). RDC and WRC are essentially filtered and synchronized read and write commands used to transfer data to and from the ISA bus without double pulsing. This also avoids double clocking of the PAB Register.

Registers D32 and D16 are control bits that determine what binary number the integral sum of the time slices in a given pulse will be divided by. The settings of bits D32 and D16 are as follows:

| D32 | D16 | Divisor |
|---|---|---|
| 0 | 0 | 8 |
| 0 | 1 | 16 |
| 1 | 0 | 32 |
| 1 | 1 | 64 |

Figures 1, 9B:
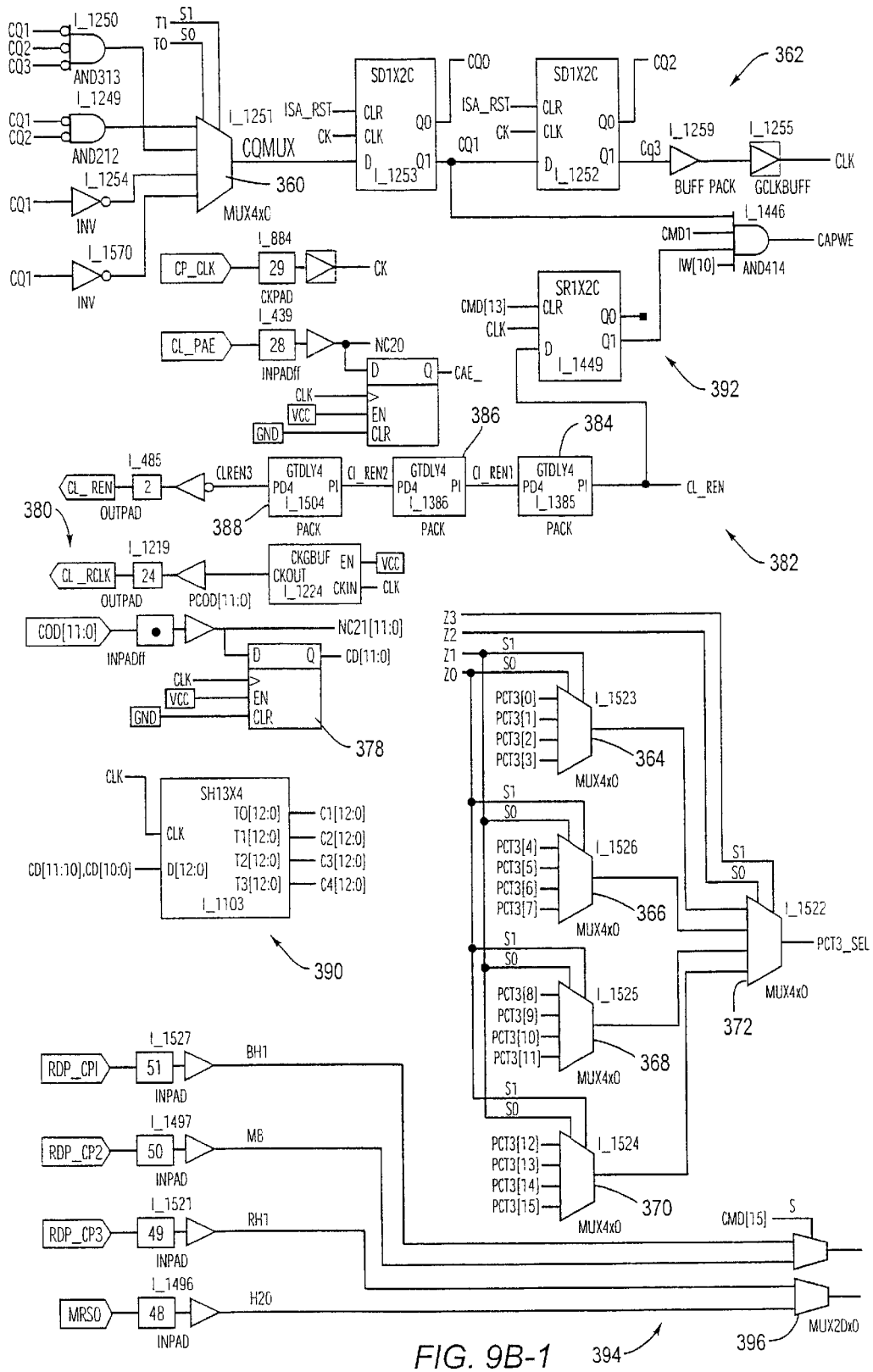
FIG. 9b is a schematic diagram of a second portion of the classification processor.
Figures 2, 9C:
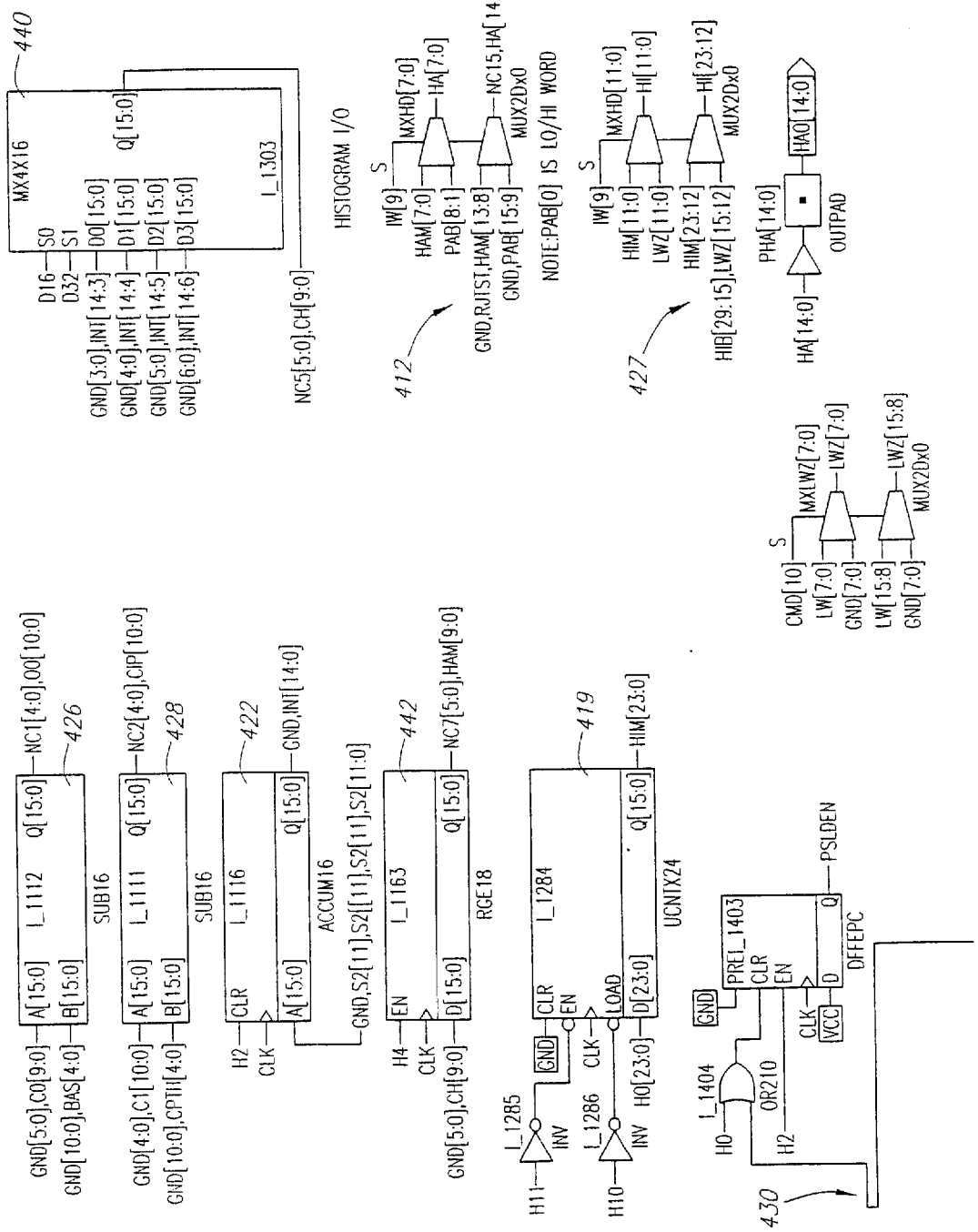
FIG. 9c is a schematic diagram of a third portion of the classification processor.
Figures 3, 9C:
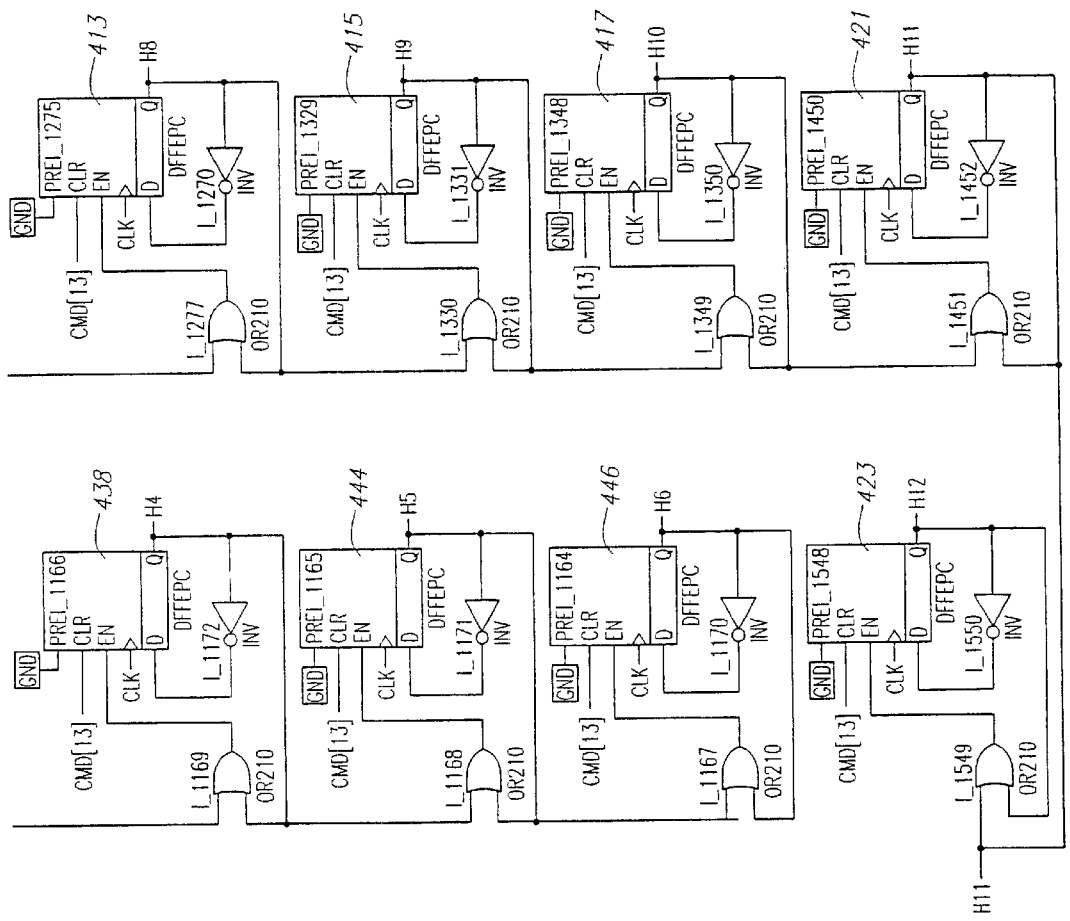
Figures 4, 9C:
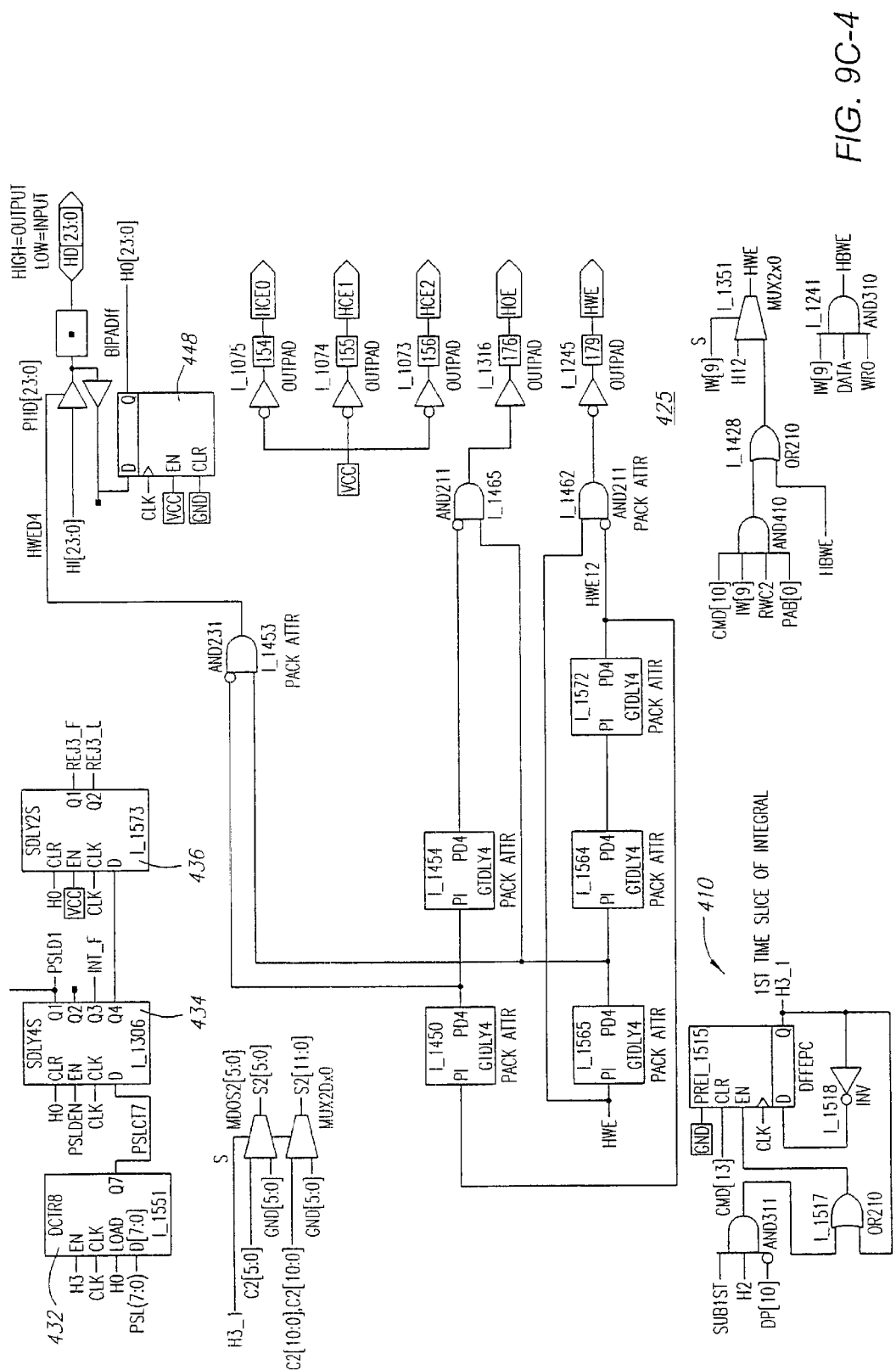
Figures 2, 9D:
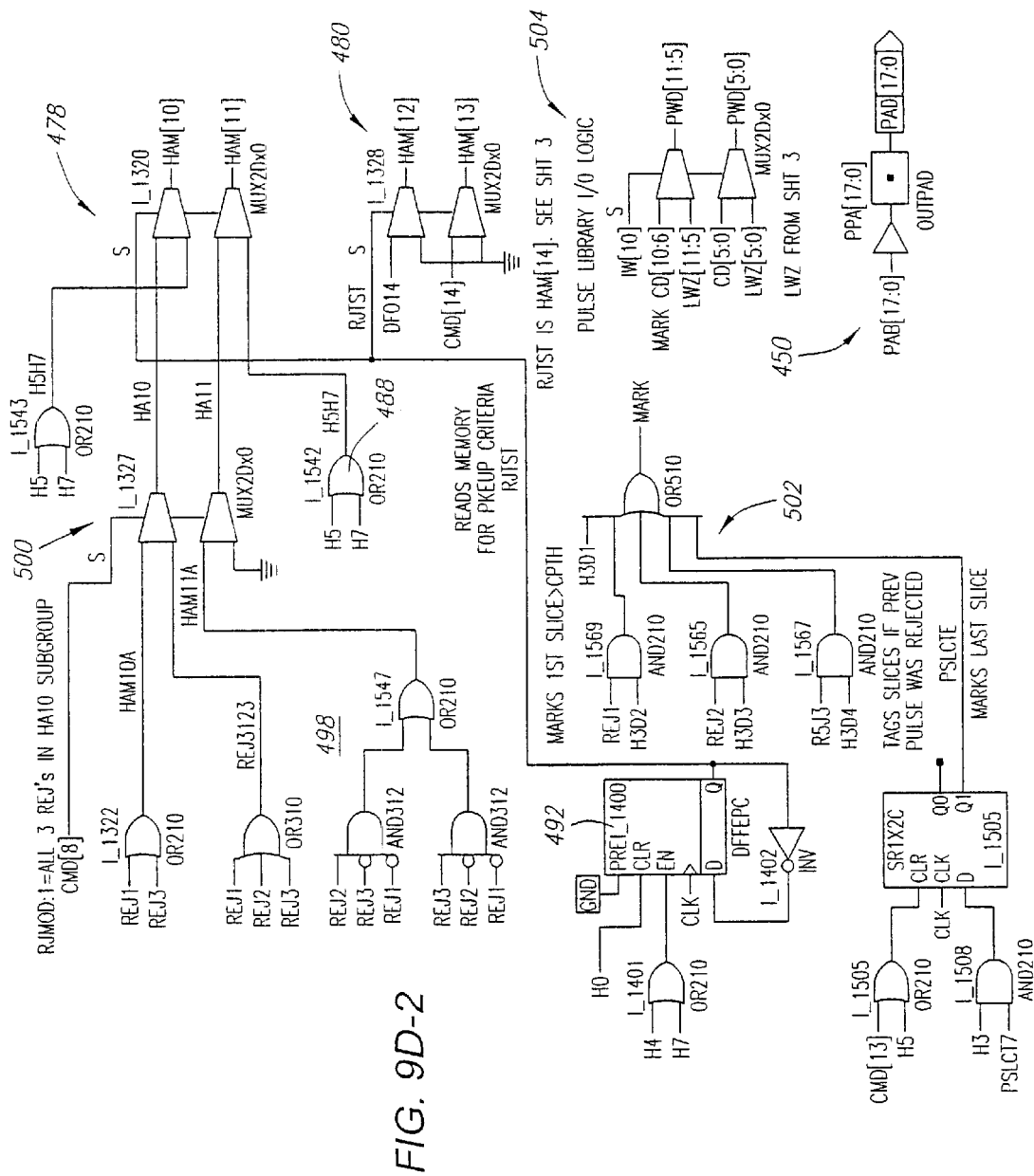
FIG. 9d is a schematic diagram of a fourth portion of the classification processor.
Figures 3, 9D:
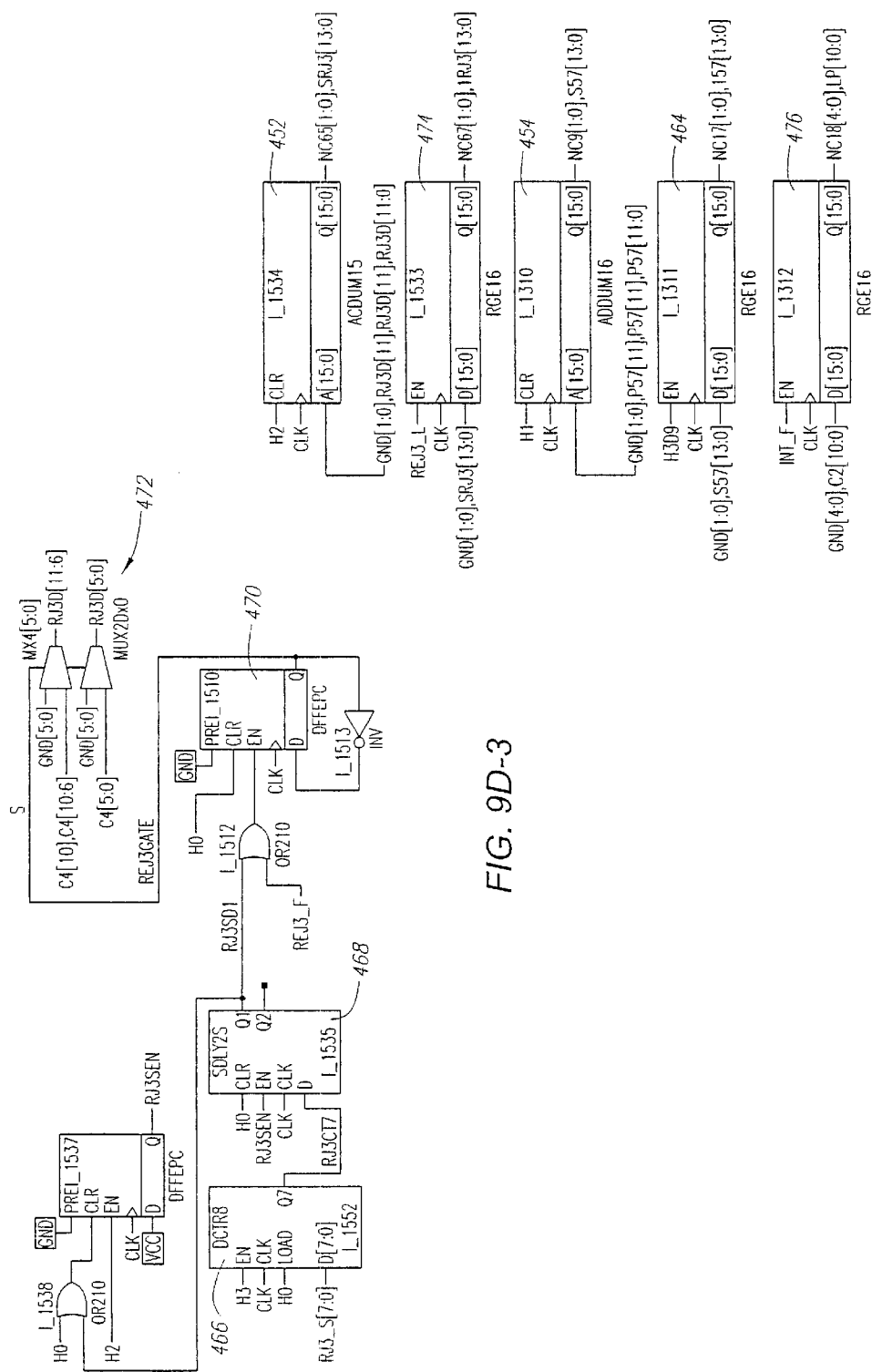
Figures 4, 9D:
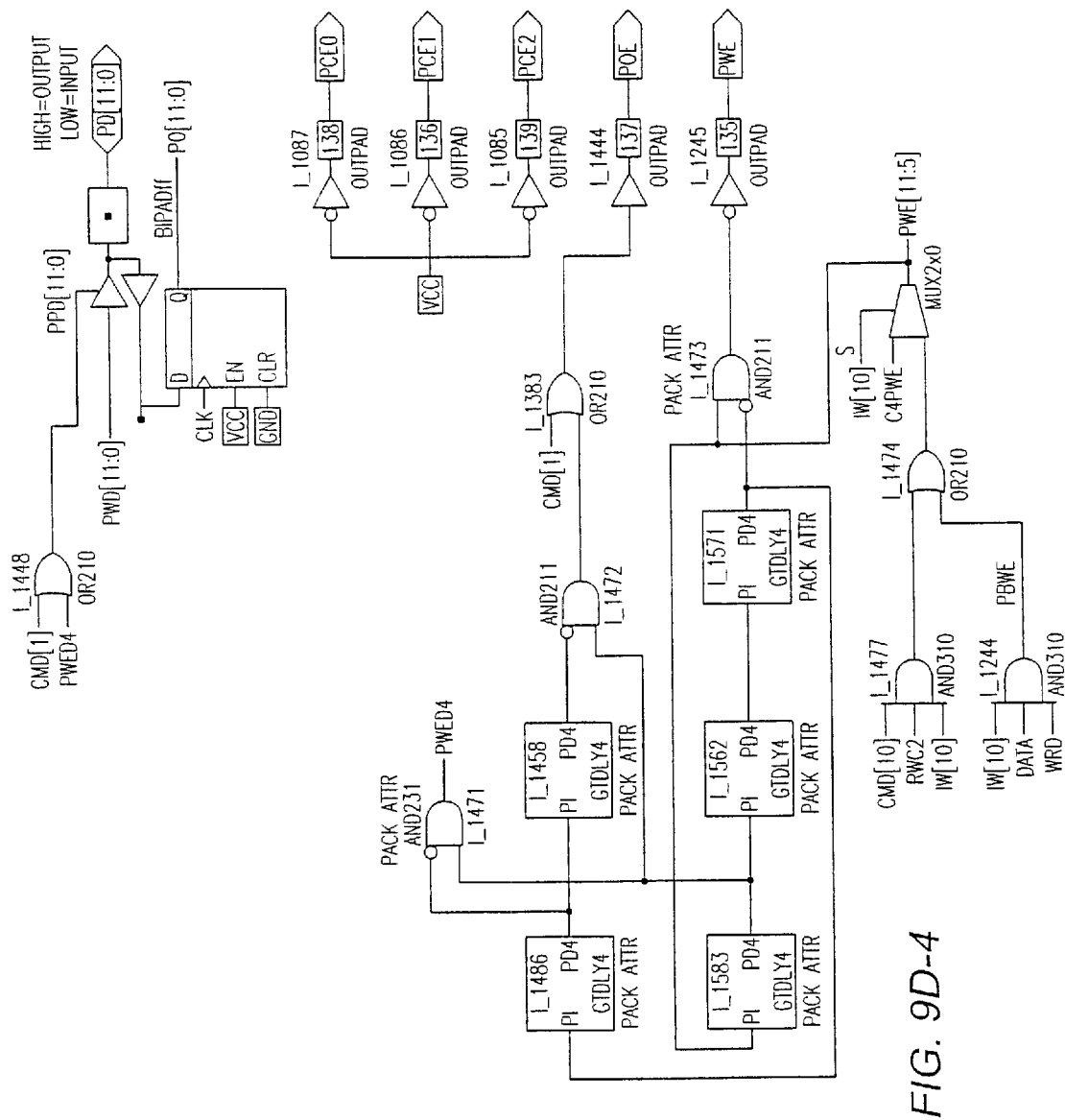

Registers T1 and T0 are control bits for a multiplexer 360 which is a part of clock generator 362 (FIG. 9b) that determines the period of the processor clock CLK relative to the incoming 80 MHz CP_CLK. The ISA_Reset register initializes bits T0 and T1 to zeros. By writing to this register, bits T1 and T0 multiply the CLK rate as follows:

| T1 | T0 | Period Multiplier |
|----|----|-------------------|
| 0  | 0  | 5                 |
| 0  | 1  | 4                 |
| 1  | 0  | 3                 |
| 1  | 1  | 2                 | h) IW=2^9; all subsequent read/write operations (A+12) are directed to the histogram memory (FIG. 9c at 412).

i) IW=2^10; all subsequent read/write operations (A+12) are directed to the pulse library memory (FIG. 9d at 450).

j) IW=2^11; bits Z3, Z2, Z1, Z0 are loaded (FIG 9 a at 324). These are control bits for multiplexers 364, 366, 368, 370 and 372 (FIG. 9b). The values of these bits selects one output PCT3_SEL from the various binary outputs PCT3[15:0] of PCT counter 374. PCT3_SEL, in turn, is input to counter 376, which generates an output counter CT3[15:0]. This accomplishes scaling from 2 to 2^16, given by the following formula (where y is the output and x is the input):

$$y = \frac{x}{2^{((Z3 \cdot Z2 \cdot Z1 \cdot Z0)+1)}}.$$

Output Registers

Four major output registers are controlled by MUX 332 (FIG. 9a):

1) CMD[15:0], at address A+8, is the Main Command Register (with IR1=0).
2) PAB[15:0], at address A+10, is the current address of the pulse library memory (PLM) or the histogram memory (HM).
3) PHO[15:0], at address A+12 is the data output of the PLM or HM. Since the HM is a 24-bit memory, the upper bits are at PHO[7:0] on the second read when PAB[0] is set to one, that is, on odd addressing of the HM. The lower 16 bits appear at PHO[15:0] on the first read. This does not apply to the PLM, as it is only a 12-bit memory. Control bit IW[10] controls the multiplexing between the outputs of the two memories (see logic at 344 of FIG. 9a).
4) DFO14, REJ1, REJ2, CAE_, and H11–H0, at address A=14. Registers DFO14, REJ1, REJ2, CAE_ are logic states of parameters described in more detail below. H[11:0] stores the states of the H State Machine, also described in more detail below:

Secondary output registers accessed by reading A+0 are controlled by the IR1 bit, which selects either CMD[15:0] (IR1=0) or CT3[15:0] (IR1=1).

FIFO Data Input

Data input for FIFO memory 110 is designated COD [11:0]. In the implementation described, this is a time-filtered gamma ray pulse input data stream (typically 41 time slices/pulse) FIFO 110. Recall that the RDP (selector 106 and extractor 108) writes this data into FIFO 110. This data is clocked into PCOD flip flop 378 (FIG. 9b) and appears at the output of flip flop 378 as CD[11:0]. The FIFO memory is continuously read by CL_RCLK at 380, but advance of the FIFO memory address is controlled by the CL_REN signal at 382. CL_REN is processed through three GTDLY4 modules 384, 386 and 388 to shift its phase back slightly from CL_RCLK. The H State Machine (discussed below) controls CL_REN State Machine—Read, Write, Zero, Increment HM or PLM This state machine is at 366, FIG. 9a. The state machine is triggered by a read or write command (RWC) input to AND gate 340, and the IW[9:10] bits (which select either the HM or PLM for read/write operations), also input to AND gate 340 via OR gate 342. State RWC0 is generated at the output of AND gate 340. RWCO is input to flip flop 342, which moves to state RWC1 after the first CLK pulse. After each address is read, if CMD[10] is set (the read and write zero control bit), zeros are written into the memory location at State RWC2 time (flip flop 344), and the address counter is incremented at RWC3 time (flip flop 346). In ISA bus write operations, only state RWC3 is used.

H State Machine

H state machine 414 is depicted in FIG. 9c. This 12-stage state machine processes incoming pulse streams into gamma ray spectra and is essentially the "brain" of classification processor 120. It is reset and initialized to State H0 by setting and clearing the CMD[13] bit that is input to flip flop 416. Flip Flop 418 controls state H1. An AND gate connected to the EN input of flip flop 418 receives H0, CMD[0] and CAE_ on its inputs. When the CAE_ bit is high, meaning that FIFO 110 holds at least 1024 time slices of unread data, the CMD[0] bit is set (high) and the state machine is in state HO (HO is high), the EN input to flip flop 418 goes high, and flip flop 418 is moved to state H1. H1 (high) clears accumulators 452 and 454 (FIG 9d), which sum time slices for pileup criteria 1 and 3.

One clock period after H1 is set, the CL_REN is set by flip flop 420, and pulse data is read from FIFO 110 (see circuit 382, FIG. 9b). The start of each new pulse is marked with bit CD[10]. State H2 is controlled by flip flop 420. An AND gate connected to the EN input of flip flop 420 receives H1 and CD[10] on its inputs. Hence, one clock after the state is H1 (H1 high) and a new pulse is read (CD[10] high), the state machine moves to state H2. H2 clears accumulators 422 (FIG 9c), which integrates the time slices to obtain the channel number or energy bin.

The baseline level BAS[4:0] is subtracted from the pulse data CD[9:0] (10-bit ADC pulse data) at by subtractor 426 (FIG 9c). Subtractor 426 outputs bits C0[10:0], which are input to shift register 390 (FIG. 9b) to produced delayed phases C1, C2, C3 and C4 of the next (baseline subtracted) pulse data. One phase later, subtractor 428 compares C1 with CPTH, the threshold level that triggers integration of a new pulse. The result is DP[10:0]. DP[10:0], the carry bit of the subtractor is set (high) until C1≧CPTH. At this time, DP[10] goes low. DP[10] (inverted) and H2 are the inputs to an AND gate connected to the EN input of flip flop 424, which sets state H3. Hence, when in state H2 and DP[10] goes low, state H3 is set on the next CLK.

State H3 drives shift registers 456, 458 and 460 (FIG. 9d), which generate signals H3D1:H3D9, each delayed by one CLK and only once CLK wide. The single CLK width is accomplished by the S57EN input to shift register 456 going low at H3D1, which prevents more than the first CLK of H3 from moving through shift register 456. The H3D1:H3D9 signals work with the logic circuitry 462 to select the proper time slices of C3[10:0], generating output P57[11:0], which is summed into S57[13:0] by accumulator 454 (FIG. 9d). If a time slice is not to be summed, P57[11:0] is made for that time. S57 is later compared with criteria 1 for a gamma ray of the magnitude measured. At time H3D9, the accumulated sum S57 is clocked into I57 at 464.

For pileup rejection criteria 3, state H3 enables counter 466 (FIG 9d) to count down from RJ3_S to FF. At this time, the counter output RJ3CT7 goes high, and delay 468 generates output RJ3SD1 on the next CLK. On the following CLK, the output REJ3GATE of flip flop 470 goes high. REJ3GATE controls MUX 472, which outputs the 4-CLK-delayed pulse data C4[11:0] as RJ3D[11:0], rather than zeros. RJ3D[11:0] is summed by accumulator 452, generating SRJ3[13:0] for pileup rejection criteria 3. REJ3GATE lasts until REJ3_F, which is input to flip flop 470 via an OR gate, turns it off. REJ3_F marks the last time slice of the pulse data integrating period, and is determined by parameter PSL[7:0] input to circuitry 430 (FIG. 9c).

Circuitry 430, which generates REJ3_F and REJ3_L, comprises counter 432 and delays 434 and 436. Starting at time H3 (the EN input to counter 432), counter 432 counts the PSL [7:0] input down to FF, at which time the counter output PSLCT7 goes high. Three CLKs later, the INT_F output delay 434 goes high; and two CLKs later, the REJ3_F output the delay 436 goes high. One CLK later REJ3_L goes high. REJ3_L is the EN input to register 474 (FIG. 9d); when REJ3_L goes high, the accumulated sum SRJ3[13:0] is clocked into IRJ3[13:0]. INT_F signals the end of the pulse integral and is the EN input to register 476. When INT_F goes high, register 476 clocks the same value of last time slice from the C2[10:0] data stream into LP[10:0], for later comparison with pileup criteria 2.

Referring again to FIG. 9c, flip flop 438 enters state H4 and state H3 is terminated one CLK after INT_F goes high. The length of the integrating period is PSL+5. The accumulated pulse integral INT[14:0], which is output by accumulator 422, is input in a shifted bit pattern to MUX 440. Control bits D16 and D32 (discussed above with reference to the index register) accomplish a division of the shifted input by a predetermined divisor. The output of MUX 440, CH[9:0], is a 1024 channel spectra that is clocked by register 442 into HAM[9:0] at time H4. H4 also causes MUX control signal RJTST (MUXs 478 and 480; FIG. 9d) to be set on the next CLK, enabling the addressing of pileup rejection criteria in banks HAM[10] and Ham [11] of the HM memory.

State H4 lasts one CLK and is input to flip flop 444 via an OR gate to enable state H5 (FIG. 9c). During state H5, pileup rejection criteria 1 (PRC1) is addressed from HM address HAM[9:0]+1024, via HAM [10] begin set by the H5 or H7 input to OR gate 482 (FIG. 9d).

State H5 lasts one CLK and is input to flip flop 446 via an OR gate to enable state H6 (FIG. 9c). During state H6, PRC1 data HD[23:0] is clocked at 448 into HO[23:0]. With H6 enabled, the HO data is subtracted from the I57 sum data by subtractor 448 (FIG. 9d). On the next CLK, flip flop 486 sets REJ1 if the result was negative, which means that the pulse failed the first pileup rejection criteria. Meanwhile, pileup rejection criteria 2 (PRC2) is addressed from HM address HAM[9:0]+2048, via HAM[10] being set by the H6 or H7 input to OR gate 488, which supplies an input to MUX 478.

State H6 lasts one CLK and is input to flip flop 411 via an OR gate to enable state H7 (FIG. 9c). During state H7, PRC2 data HD[23:0] is clocked at 448 into HO[23:0]. With H7 enabled, the HO data is subtracted from LP[10:0], which is the last time slice of the pulse, by subtractor 489 (FIG. 9d). On the next CLK, flip flop 490 sets REJ2 if the result was greater than or equal to zero, which means that the pulse failed the second pileup rejection criteria. Essentially, this indicates that the value of the last time slice was larger than a normal last time slice for that channel number. Meanwhile, pileup rejection criteria 3 (PRC3) is addressed from HM address HAM[9:0]+1024+2048, via HAM[10]+HAM[11] being set by the H7 input to OR gate 488, which supplies an input to MUX 478. H7 is also input to flip flop 492 via an OR gate, causing RJTST (the output of flip flop 492) to be cleared on the next CLK, as addressing of pileup criteria will then be finished.

State H7 lasts one CLK and is input to flip flop 413 via an OR gate to enable state H8 (FIG 9c). During state H8, PRC3 data HD[23:0] is clocked at 448 into HO[23:0]. With H8 enabled, the HO data is subtracted from IRJ3[13:0], which is the sum of the last n time slices determined by parameter RJ3_S, by subtractor 494 (FIG. 9d). On the next CLK pulse, flip flop 496 sets REJ3 if the result was greater than or equal to zero, which means that the pulse failed the third pulse rejection criteria.

State H8 lasts one CLK and is input to flip flop 415 via an OR gate to enable state H9 (FIG. 9c). During state H9, the combination of HAM[9:0] and various combinations of REJ1, 2, and 3 (FIG. 9d at 498,) operate to generate the HAM[10:11] banks into which the pulse is stored. If HAM [10:11]=[0 0], the pulse is valid and is stored in the lowest bank of HAM[9:0]; where all good or non-piled pulses are accumulated into a spectrum. When CMD[8], the control bit to MUX 500, is set, RJMOD routes all rejected pulses to spectral bank HAM[10].

State H9 lasts one CLK and is input to flip flop 417 via an OR gate to enable state H10 (FIG. 9c). During state H10, the data read from the HM at location HAM[11:0] is loaded into UP counter 419.

State H10 lasts one CLK and is input to flip flop 421 via an OR gate to enable state H11. During state H11, the spectral data at the channel or HM memory address is incremented by one by counter 419, with the resultant incremented address appearing at the output of counter 419 as HIM[23:0].

State H11 lasts one CLK and is input to flip flop 423 via an OR gate to enable state H12. During state H12, the newly incremented address is re-stored back into address HAM [11:0] via logic blocks 425 and 427.

State H12 lasts one CLK and is input to flip flop 416 to return the state machine to state H0.

Additional Features

Other features of CP 120 include saving the pulse data to the pulse library, including certain time slices, by use of high order bits at key points in the processing cycle. The marking logic is shown at 502, FIG. 9d. At time H3D1, the first time slice greater than or equal to the threshold CPTH is marked. At time H3D2, the next time slice is marked if the previous pulse was rejected by PRC1 (REJ1 had been set). At time H3D3, the next time slice is marked if the previous pulse was rejected by PRC2 (REJ2 had been set). At time H3D4, the next time slice is marked if the previous pulse was rejected by PRC3 (REJ3 had been set). The last slice of the pulse data stream summed into the INT[14:0] integral is also marked. Reference is again made to the drawing figures for examples of pulses that passed all pileup rejection criteria and pulses that failed certain criteria. This data comes directly from a readout of the pulse library memory.

These marks are added at the 11th bit to the original data stream CD[10:0] coming into CP 120 from FIFO 110 (see pulse library logic 504; FIG. 9d). Recall that CD[10:0] is a mark put on the stream by the RDP denoting the first time slice of a gross pulse event stored in FIFO 110. Control signal C4PWE is derived by logic 392 from CL_REN (FIG. 9b). This control signal gates and controls the wiring of pulse to the Pulse Library Memory, which has a capacity of 256 K (262,144) words. The PLM can be read onto the ISA bus, and is particularly useful to capture and examine pulse data that has either been accepted as good or rejected as having pileup contamination.

The PLM is also used to collect standard, non-piled pulses for mathematical generation of the pileup rejection criteria. Typically, 100 pulses of each energy or channel number are collected and averaged for shape. Each of the three rejection criteria is then calculated from the sums of the various time slices that go into each criteria. DFO14 is a mark from the DAC waveform generator that is added to the input stream on CD[11] and input to MUX 480 (FIG. 9*d*). If this bit is set at any time during the pulse the spectral data will be stored in the HAM[12] memory banks. Control Bit CMD[14] is also input to MUX 480 and can be set to store the spectral data in the HAM[13] memory banks.

Recall that PCT counter 374 generates an output bits PCT3[15:0] that are used to generate a data output count CT 3 from counter 376 (FIG 9*b*). Using circuitry 394 and logic control parameters CMD[4,5,11,12,15], various other events can be counted. BHI, M6, and RHI are input from the RDP to MUX 396. Depending on the setting of MUX control parameter CMD[15], these events may be counted. H20 is input from an external input line to I/O pin 48 to MUX 396. Again, depending on the setting of CMD[15], this event may be counted. CD[10], which is the mark put on the first time slice of the pulse packet sent to FIFO 110 by the RDP, is input to MUX 398. Depending on the settings of CMD[4:5], this event may be counted. REJ123 is the logical OR of the pulse pileup rejection decisions for any given pulse. REJ123 is also input to MUX 398 (after a logical AND with H8) and may be counted depending on CMD[4:5]. DFO14, which is the mark put into bit 11 of the ADC data stream by the DAC waveform generator when it is active, is also input to MUX 398 and may be counted. CLK, which provides a tally of the primary clock frequency running CP 120 is also provided to MUX 398 and may be counted. During normal spectral analysis, CT 3 is set to count CLK, so that the data can be normalized to real-time. The output of multiplexers 396 and 398 are themselves multiplexed at multiplexer 399, whose output is controlled by logic parameter CMD[11:12].

It should be noted that if a larger capacity pASIC were implemented, more counters could be implemented and some of circuitry 394 avoided.

All patents and publications mentioned herein are indicative of the levels of skill of those skilled in the art to which this invention pertains, and are incorporated by reference to the same extent as if each reference had been incorporated by reference in its entirety individually.

Those of skill in the art will readily appreciate that the present invention is adapted to carry out the objects and obtain the ends and advantages mentioned, as well as those inherent therein. The specific methods and devices described are for exemplary purposes and are not intended as limitations on the scope of the invention. Changes, substitutions, modifications, and other uses will occur to those skilled in the art which are encompassed within the scope and spirit of the invention as defined by the claims. It should be recognized, for example, that the invention could be practiced with a variety of signal sources.

The present invention may be practiced in the absence of any element or elements, limitation or limitations not specifically disclosed herein. Thus, for example, the terms "comprising" "consisting essentially of" and "consisting of" are interchangeable. These and similar terms are employed as terms of description and not of limitation. Where features or aspects of the invention are described in terms of Markush groups or other grouping of alternatives, it should be recognized that the invention is thereby described in terms of any individual member or subgroup of members of the Markush group or other group. For example, if there are alternatives, A, B, and C, all of the following possibilities are included: A separately, B separately, A and B, A and C, B and C, and A and B and C.

Thus, additional embodiments are within the scope of the invention and the following claims.

TABLE I

Pileup vs. Count Rate for Various Pulse Integration Times

| Count Rate (cps) | Integration Time (ns) | Pileup Percent | Integration Time (ns) | Pileup Percent | Integration Time (ns) | Pileup Percent |
|---|---|---|---|---|---|---|
| 0 | 400 | 0.0% | 1,000 | 0.0% | 2,000 | 0.0% |
| 10,000 | 400 | 0.4% | 1,000 | 1.0% | 2,000 | 2.0% |
| 25,000 | 400 | 1.0% | 1,000 | 2.5% | 2,000 | 4.9% |
| 50,000 | 400 | 2.0% | 1,000 | 4.9% | 2,000 | 9.5% |
| 75,000 | 400 | 3.0% | 1,000 | 7.2% | 2,000 | 13.9% |
| 100,000 | 400 | 3.9% | 1,000 | 9.5% | 2,000 | 18.1% |
| 150,000 | 400 | 5.8% | 1,000 | 13.9% | 2,000 | 25.9% |
| 200,000 | 400 | 7.7% | 1,000 | 18.1% | 2,000 | 33.0% |
| 400,000 | 400 | 14.8% | 1,000 | 33.0% | 2,000 | 55.1% |
| 600,000 | 400 | 21.3% | 1,000 | 45.1% | 2,000 | 69.9% |
| 800,000 | 400 | 27.4% | 1,000 | 55.1% | 2,000 | 79.8% |
| 1,000,000 | 400 | 33.0% | 1,000 | 63.2% | 2,000 | 86.5% |

TABLE 2

Table of Pulse Data, Rejection Criteria and Pass/Fail Results for Four Cominations of Two Pulses, and Four Ideal Pulses of Equivalent Energy.

| Pulse Combination | | | | | | |
|---|---|---|---|---|---|---|
| | Piled-Up Pulses | | | | | |
| Criteria #1 | Pulse Integral Silces 1:32 | Pulse Channel Integral/32 | Region 1 Sum Silces 5:7 | Region 1 Criteria Silces 5:7 | Region 1 Decision Pass/Fail | Region 1 Pass Test Margin |
| Pulse 1 & 2 | 7364 | 230 | 308 | 1194 | Fail | −866 |
| Pulse 3 & 4 | 9601 | 300 | 1218 | 1563 | Fail | −345 |
| Pulse 5 & 6 | 7280 | 227 | 1218 | 1178 | Pass | 40 |
| Pulse 7 & 8 | 7162 | 223 | 1218 | 1157 | Pass | 61 |

TABLE 2-continued

Table of Pulse Data, Rejection Criteria and Pass/Fail Results for Four Cominations of Two Pulses, and Four Ideal Pulses of Equivalent Energy.

Pulse Combination

| Criteria #2 | Pulse Integral Silces 1:32 | Pulse Channel Integral/32 | Region 2 Last Point Index 32 | Region 2 Criteria Index 32 | Region 2 Decision Pass/Fail | Region 2 Pass Test Margin |
|---|---|---|---|---|---|---|
| Pulse 1 & 2 | 7384 | 230 | 120 | 109 | Fail | −11 |
| Pulse 3 & 4 | 9601 | 300 | 201 | 140 | Fail | −61 |
| Pulse 5 & 6 | 7280 | 227 | 103 | 108 | Pass | 5 |
| Pulse 7 & 8 | 7162 | 223 | 110 | 106 | Fail | −4 |

| Criteria #3 | Pulse Integral Silces 1:32 | Pulse Channel Integral/32 | Region 3 Sum Silces 27:32 | Region 3 Criteria Silces 27:32 | Region 3 Decision Pass/Fail | Region 3 Pass Test Margin |
|---|---|---|---|---|---|---|
| Pulse 1 & 2 | 7364 | 230 | 832 | 685 | Fail | −147 |
| Pulse 3 & 4 | 9601 | 300 | 1445 | 890 | Fail | −555 |
| Pulse 5 & 8 | 7280 | 227 | 712 | 676 | Fail | −36 |
| Pulse 7 & 8 | 7162 | 223 | 625 | 665 | Pass | 40 |

Single Pulse of Same Integral Value

| Criteria #1 | Pulse Channel Integral/32 | Pulse Sum Slices 5:7 | Region 1 Decision Pass/Fail | Region 1 Passing Margin($3\sigma$) | Region 1 Criteria S.D.($\sigma$) |
|---|---|---|---|---|---|
| Pulse 1 & 2 | 230 | 1263 | Pass | 69 | 21 |
| Pulse 3 & 4 | 300 | 1642 | Pass | 79 | 24 |
| Pulse 5 & 6 | 227 | 1244 | Pass | 66 | 21 |
| Pulse 7 & 8 | 223 | 1220 | Pass | 63 | 21 |

| Criteria #2 | Pulse Channel Integral/32 | Pulse Last Point Index 32 | Region 2 Decision Pass/Fail | Region 2 Passing Margin($5\sigma$) | Region 2 Criteria S.D.($\sigma$) |
|---|---|---|---|---|---|
| Pulse 1 & 2 | 230 | 86 | Pass | 23 | 5 |
| Pulse 3 & 4 | 300 | 112 | Pass | 28 | 5 |
| Pulse 5 & 6 | 227 | 84 | Pass | 24 | 5 |
| Pulse 7 & 8 | 223 | 83 | Pass | 23 | 5 |

| Criteria #3 | Pulse Channel Integral/32 | Pulse Sum Slices 27:32 | Region 3 Decision Pass/Fail | Region 3 Passing Margin($4\sigma$) | Region 3 Criteria S.D.($\sigma$) |
|---|---|---|---|---|---|
| Pulse 1 & 2 | 230 | 803 | Pass | 82 | 20 |
| Pulse 3 & 4 | 300 | 792 | Pass | 98 | 24 |
| Pulse 5 & 8 | 227 | 597 | Pass | 79 | 20 |
| Pulse 7 & 8 | 223 | 584 | Pass | 81 | 19 |

What is claimed is:

1. A valid event discrimination method, in a full spectrum nuclear spectroscopic examination device, to discriminate between an uncontaminated single event pulse and a piled pulse of equivalent size or energy, comprising the steps of:
   a) calculating a plurality of pulse shape description parameter from a plurality of separate regions over the full signal length of a captured and measured, digitized event pulse of any size or energy quantum;
   b) calculating the size or energy of said captured pulse by numerical integration of the time slices over the full or fixed time-truncated signal length of said captured pulse;
   c) accepting said measured, digitized pulse as an uncontaminated single event pulse, within said spectrum, if said calculated region parameters satisfy all said regional parameter criteria of said separate, unpiled, standard pulse, and rejecting said measured, digitized pulse if said calculated regional parameters do not satisfy all said region parameter criteria of said separate, unpiled, standard pulse; and
   d) comparing said calculated parameters to other parameter criteria for the same plurality of regions of a separate, unpiled, standard pulse of equal size or energy in said spectrum;
   e) in the first or designated spectral memory for accepted pulses, incrementing by one, the count or tally in the memory location representing the size or energy of said pulse, if said measured digitized pulse is accepted.

2. The method of claim 1 including the additional steps of:
   a) insuring that one of the calculated pulse shape parameters is the amplitude of said pulse.

3. A valid event discrimination method, in a full spectrum nuclear spectroscopic examination device, to discriminate between an uncontaminated single event pulse and a piled pulse, comprising the steps of:
   a) identifying an event pulse and determining whether an immediately previous event pulse has decayed to a baseline level, and rejecting the identified event pulse if the previous event pulse did not decay to the baseline level;

b) calculating a plurality of pulse shape description parameters from a plurality of separate regions over the full signal length of a captured and measured, digitized event pulse of any size or energy quantum;

c) calculating the size or energy of said captured pulse by numerical integration of the time slices over the full or fixed time-truncated signal length of said captured pulse;

d) accepting said measured, digitized pulse as an uncontaminated single event pulse, within said spectrum, if said calculated regional parameters satisfy all said regional parameter criteria of said separate, unpiled, standard pulse, and rejecting said measured, digitized pulse if said calculated regional parameters do not satisfy all said regional parameter criteria of said separate, unpiled, standard pulse; and e) comparing said calculating parameters to other parameter criteria for the same plurality of regions of a separate, unpiled, standard pulse of equal size or energy in said spectrum;

f) in the first or designated spectral memory for accepted pulses, incrementing by one, the count or tally in the memory location representing the size or energy of said pulse, if said measured digitized pulse is accepted.

4. The method of claim 3 further including, following said step of determining whether an immediately previous pulse has decayed to a baseline level, and rejecting the pulse if the previous pulse did not decay to the baseline level, the step of marking a first time slice of the pulse for processing after the pulse amplitude has passed an amplitude trigger level.

5. The method of claim 4 including the step of integrating the pulse from the first time slice to a predetermined last time slice.

6. A method of discriminating an uncontaminated single event pulse from a piled pulse in a full spectrum nuclear spectroscopic examination, comprising the steps of:

a) calculating at least three pulse shape description parameters for a plurality of separate regions over the full signal length of a measured, digitized pulse wherein said regions include at least the peak of said pulse, a last time slice of said pulse, and over at least one other region between the peak and the last time slice of said digitized pulse;

b) calculating the size or energy of said captured pulse by numerical integration of the time slices over the full or fixed time-truncated signal length of said captured pulse;

c) comparing said calculated parameters to other parameter criteria for the same plurality of regions of a separate, unpiled, standard pulse of equal size or energy in said spectrum;

d) accepting said measured, digitized pulse as an uncontaminated single event pulse, within said spectrum, if said calculated regional parameters satisfy all said regional parameter criteria of said separate, unpiled, standard pulse and rejecting said pulse if said calculated regional parameters do not satisfy all said regional parameter criteria of said separate, unpiled, standard pulse; and, e) in the first or designated spectral memory for accepted pulses, incrementing by one, the count or tally in the memory location representing the size or energy of said pulse, if said measured digitized pulse is accepted.

7. The method as claimed in claim 6, wherein the parameters are selected from a group comprising a simple sum parameter in the form $a=\Sigma y$; a slope parameter in the form $a=ax+b$; a second-degree polynomial parameter in the form $y=ax^2+bx+c$; a third degree polynomial in the form $y=ax^3+bx^2+cx+d$; an exponential parameter in the form $y=ae^{-bx}$, wherein y represents the ADC values over the time slice region, and x represents the particular time slice number.

8. The Method as claimed in claim 7 wherein a first parameter is calculated as the sum of the ADC value of time slices 5–7 in the first region, a second parameter is valued as the ADC value of time slice 32 and a third parameter is calculated as the sum of the ADC values of time slice 27–32.

9. The method of claim 4, wherein the pulse is sensed using a PGNAA analyzer.

10. A valid event discriminator for use with a full spectrum nuclear spectroscopic device having one or more radiation source(s), for use in radiating matter, and one or more light detector(s) receiving gamma ray generated event lights in response to radiation interaction therewith, the device comprising a summing means for producing a sum signal from light detectors if more than one light detector is used, and validity analyzing means for accepting a valid event indicator signal in response to said sum signal or single light detector signal, characterized in that it further comprises:

a) an analog-to-digital converter for digitizing the sensed pulses into discrete ADC values over a plurality of separate and spaced-apart time slices over the full signal length of a sensed pulse;

b) means for calculating the size or energy of said digitized pulses over the full or fixed time-truncated length of said digitized pulses;

c) means for storing number of said digitized pulses as a function of the size or energy value of said digitized pulses in a histogram type spectral memory;

d) means for calculating at least one parameter from each said digitized time slice of a stored, digitized pulse;

e) means for comparing said calculated parameters to other parameter criteria for the same plurality of regions of separate, unpiled, standard pulses of equal size or energy in said spectrum and discriminating between accepted pulses (those that fit said other parameter criteria) and rejected pulses (those that do not fit said other parameter criteria);

f) designated spectral memory bank for storing the number or histogram said accepted pulses as a function of size or energy.

11. The pulse processor as claimed in 10, further comprises designated second, third or ($n^{th}+1$) spectral memory banks for storing the number of histogram of said rejected pulses as a function of size or energy of said digitized pulse, with the spectral memory bank designation ($n^{th}+1$) determined by the first of the $n^{th}$ parameter criteria that determined the rejection of said digitized pulse.

12. The pulse processor as claimed in claim 10, wherein the classification processor further comprises a qualifying and marking block that confirms that a previous pulse has decayed back to a baseline level and that a current pulse has risen to a trigger level.

13. The pulse processor as claimed in claim 12, wherein the qualifying and marking block comprise a state machine using two ADC level comparators C1 and C2 to compare the current ADC value of a pulse to the baseline level and to the trigger level, the current time slice of the pulse being marked as the first time slice when it meets or exceeds the trigger level.

14. The pulse processor as claimed in claim 12 and further comprising a first accumulator that integrates a qualified pulse from a first time slice to a last time slice.

15. The pulse processor as claimed in claim 10, wherein the means for calculating at least one parameter comprises a second accumulator the sums the ADC values of a plurality of time slices in a peak region of the pulse.

16. The pulse processor as claimed in claim 15, wherein the second accumulator sums the ADC values of time slices 5–7.

17. The pulse processor as claimed in claim 14, wherein the means for comparing the calculated parameter to a criteria comprises a first subtractor that generates the difference between a first criteria and the summed time slices of the peak region.

18. The pulse processor as claimed in claim 14, wherein the means for calculating at least one parameter further comprises a third accumulator that obtains the ADC value of the last time slice of the current pulse.

19. The pulse processor as claimed in claim 18, wherein the third accumulator obtains the ADC value of time slice number 32.

20. The pulse processor as claimed in claim 18, wherein the means for comparing the calculated parameter to a criteria further comprises a second subtractor that generates the difference between a second criteria and the last time slice.

21. The pulse processor as claimed in claim 18, wherein the means for deriving at least one parameter further comprises a fourth accumulator that sums that ADC values of the last n time slices of the current pulse.

22. The pulse processor as claimed in claim 21, the fourth accumulator sums the ADC values of time slices 27–32 of the current pulse.

23. The pulse processor as claimed in claim 18, wherein the means for comparing the calculated parameter to a criteria further comprises a third subtractor that generates the difference between a third criteria and the sum of the last n time slices.

24. A method of discriminating an uncontaminated single event pulse from a piled pulse in a full spectrum X-ray examination, comprising the steps of:
   a) calculating at least three pulse shape description parameters for a plurality of separate regions over the full signal length of a measured, digitized pulse wherein said regions include at least the peak of said pulse, a last time slice of said pulse, and over at least one other region between the peak and the last time slice of said digitized pulse
   b) calculating the size or energy of said captured pulse by numerical integration of the time slices over the full or fixed time-truncated signal length of said captured pulse;
   c) comparing said calculated parameters to other parameter criteria for the same plurality of regions of a separate, unpiled, standard pulse of equal size or energy in said spectrum;
   d) accepting said measured, digitized pulse as an uncontaminated single event pulse, within said spectrum, if said calculated regional parameters satisfy all said regional parameter criteria of said separate, unpiled, standard pulse and rejecting said pulse if said calculated regional parameters do not satisfy all said regional parameter criteria of said separate, unpiled, standard pulse; and,
   e) in the first or designated spectral memory for accepted pulses, incrementing by one, the count or tally in the memory location representing the size or energy of said pulse, if said measured digitized pulse is accepted.

25. A method of discriminating an uncontaminated single event pulse from a piled pulse in a full spectrum Gamma ray examination, comprising the steps of;
   a) calculating at least three pulse shape description parameters for a plurality of separate regions over the full signal length of a measured, digitized pulse wherein said regions include at least the peak of said pulse, a last time slice of said pulse, and over at least one other region between the peak and the last time slice of said digitized pulse;
   b) calculating the size or energy of said captured pulse by numerical integration of the time slices over the full or fixed time-truncated signal length of said captured pulse;
   c) comparing said calculated parameters to other parameter criteria for the same plurality of regions of a separate, unpiled, standard pulse of equal size or energy in said spectrum;
   d) accepting said measured, digitized pulse as an uncontaminated single event pulse, within said spectrum, if said calculated regional parameters satisfy all said regional parameter criteria of said separate, unpiled, standard pulse and rejecting said pulse if said calculated regional parameters do not satisfy all said regional parameter criteria of said separate, unpiled, standard pulse; and,
   e) in the first or designated spectral memory for accepted pulses, incrementing by one, the count or tally in the memory location representing the size or energy of said pulse, if said measured digitized pulse is accepted.

26. A method of discriminating an uncontaminated single event pulse from a piled pulse in any full spectrum electronic pulse examination, comprising the steps of:
   a) calculating at least three pulse shape description parameters for a plurality of separate regions over the full signal length of a measured, digitized pulse wherein said regions include at least the peak of said pulse, a last time slice of said pulse, and over at least one other region between the peak and the last time slice of said digitized pulse;
   b) calculating the size or energy of said captured pulse by numerical integration of the time slices over the full or fixed time-truncated signal length of said captured pulse;
   c) comparing said calculating parameters to other parameter criteria for the same plurality of regions of a separate, unpiled, standard pulse of equal size or energy in said spectrum;
   d) accepting said measured, digitized pulse as an uncontaminated single event pulse, within said spectrum, if said calculated regional parameters satisfy all said regional parameter criteria of said separate, unpiled, standard pulse and rejecting said pulse if said calculated regional parameters do not satisfy all said regional parameter criteria of said separate, unpiled, standard pulse; and
   e) in the first or designated spectral memory for accepted pulses, incrementing by one, the count or tally in the memory location representing the size or energy of said pulse, if said measured digitized pulse is accepted.

* * * * *